United States Patent
Yamada

(10) Patent No.: US 7,173,736 B2
(45) Date of Patent: Feb. 6, 2007

(54) IMAGE PROCESSING APPARATUS AND METHOD

(75) Inventor: Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/932,000

(22) Filed: Sep. 2, 2004

(65) Prior Publication Data

US 2005/0024662 A1 Feb. 3, 2005

Related U.S. Application Data

(63) Continuation of application No. PCT/JP03/11047, filed on Aug. 29, 2003.

(30) Foreign Application Priority Data

Aug. 30, 2002 (JP) ............................. 2002-255244
Sep. 25, 2002 (JP) ............................. 2002-279371

(51) Int. Cl.
*H04N 1/60* (2006.01)
*G03F 3/08* (2006.01)

(52) U.S. Cl. ....................... 358/1.9; 358/518; 358/520; 382/162; 382/167

(58) Field of Classification Search ................ 358/1.9, 358/1.12, 1.13, 1.14, 1.15, 2.1, 500, 518, 358/520, 3.26, 1.1, 1.18, 527, 517, 519, 515; 382/162, 163, 167, 165
See application file for complete search history.

(56) References Cited

U.S. PATENT DOCUMENTS

| 5,377,024 A | 12/1994 | Dillinger ................... 358/502 |
| 5,473,446 A | 12/1995 | Perumal, Jr. et al. ....... 358/523 |
| 5,510,910 A | 4/1996 | Bockman et al. ........... 358/502 |
| 5,537,228 A | 7/1996 | Dillinger ................... 358/502 |
| 5,657,137 A | 8/1997 | Perumal, Jr. et al. ....... 358/502 |
| 5,742,296 A | 4/1998 | Yamada et al. ............. 345/431 |
| 5,883,632 A | 3/1999 | Dillinger ................... 345/589 |
| 5,917,994 A | 6/1999 | Perumal, Jr. et al. ....... 358/109 |
| 5,933,252 A | 8/1999 | Emori et al. ................ 358/500 |
| 5,991,511 A | 11/1999 | Granger ..................... 395/109 |
| 6,128,022 A | 10/2000 | Dillinger ................... 345/591 |
| 6,211,971 B1 | 4/2001 | Specht ...................... 358/1.9 |
| 6,360,008 B1 * | 3/2002 | Suzuki et al. ............... 382/167 |
| 6,421,142 B1 * | 7/2002 | Lin et al. .................... 358/1.9 |
| 6,738,151 B1 * | 5/2004 | Kato ......................... 358/1.12 |
| 6,744,544 B1 * | 6/2004 | Nagashima et al. ........ 358/518 |
| 6,771,314 B1 * | 8/2004 | Bawolek et al. ............ 348/272 |
| 6,822,760 B1 | 11/2004 | Spaulding et al. .......... 358/1.9 |
| 6,870,523 B1 * | 3/2005 | Ben-David et al. .......... 345/84 |
| 6,985,524 B1 * | 1/2006 | Borchers .................... 375/240 |

(Continued)

FOREIGN PATENT DOCUMENTS

EP 569206 A2 5/1992

(Continued)

*Primary Examiner*—Dov Popovici
(74) *Attorney, Agent, or Firm*—Fitzpatrick, Cella, Harper & Scinto

(57) ABSTRACT

A color conversion technique which places an importance on a color difference and converts an input color outside a gamut into a color inside the gamut to minimize the color difference is available. However, this technique does not determine whether the input color falls inside or outside a visual limit range. Upon processing image data between image input/output devices, image data is input (S201), it is determined whether the input image data falls outside a predetermined gamut (S204), and image data which is determined to fall outside the gamut is converted into a color on the inframarginal portion of or inside the gamut (S206).

9 Claims, 39 Drawing Sheets

U.S. PATENT DOCUMENTS

| | | | |
|---|---|---|---|
| 6,999,617 B1 * | 2/2006 | Ohga | 382/167 |
| 2001/0017627 A1 | 8/2001 | Marsden et al. | 345/501 |
| 2002/0060688 A1 | 5/2002 | Mizumoto | 345/591 |
| 2003/0048464 A1 | 3/2003 | Yamada et al. | 358/1.9 |
| 2003/0161530 A1 | 8/2003 | Yamada et al. | 382/167 |
| 2003/0185437 A1 | 10/2003 | Nakami | 382/162 |
| 2003/0202194 A1 | 10/2003 | Torigoe et al. | 358/1.9 |

FOREIGN PATENT DOCUMENTS

| | | |
|---|---|---|
| EP | 0 523 898 A1 | 1/1993 |
| EP | 0 569 206 A3 | 11/1993 |
| EP | 0 665 682 A2 | 8/1995 |
| EP | 0 675 638 A2 | 10/1995 |
| EP | 0 665 674 A3 | 5/1996 |
| EP | 0 739 126 A2 | 10/1996 |
| JP | 4-40072 | 2/1992 |
| JP | 4-186969 | 7/1992 |
| JP | 6-38033 | 2/1994 |
| JP | 6-90351 | 3/1994 |
| JP | 7-222019 | 8/1995 |
| JP | 11-187419 | 7/1999 |
| JP | 2000-324350 | 11/2000 |
| JP | 2002-27275 | 1/2002 |
| JP | 2002-150277 | 5/2002 |
| JP | 2003-209706 A | 7/2003 |
| RU | 2073913 C1 | 2/1997 |
| WO | WO 92/05556 | 4/1992 |
| WO | WO 01/17233 A1 | 3/2001 |

* cited by examiner

FIG. 4A

|  | X | Y | Z |
|---|---|---|---|
| BLACK INFORMATION | ##.## | ##.## | ##.## |
| WHITE INFORMATION | ##.## | ##.## | ##.## |

FIG. 4B

| L | C | H |
|---|---|---|
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |

FIG. 12A

|  | R | G | B |
|---|---|---|---|
| BLACK INFORMATION | ##.## | ##.## | ##.## |
| WHITE INFORMATION | ##.## | ##.## | ##.## |

FIG. 12B

| L | C | h |
|---|---|---|
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |

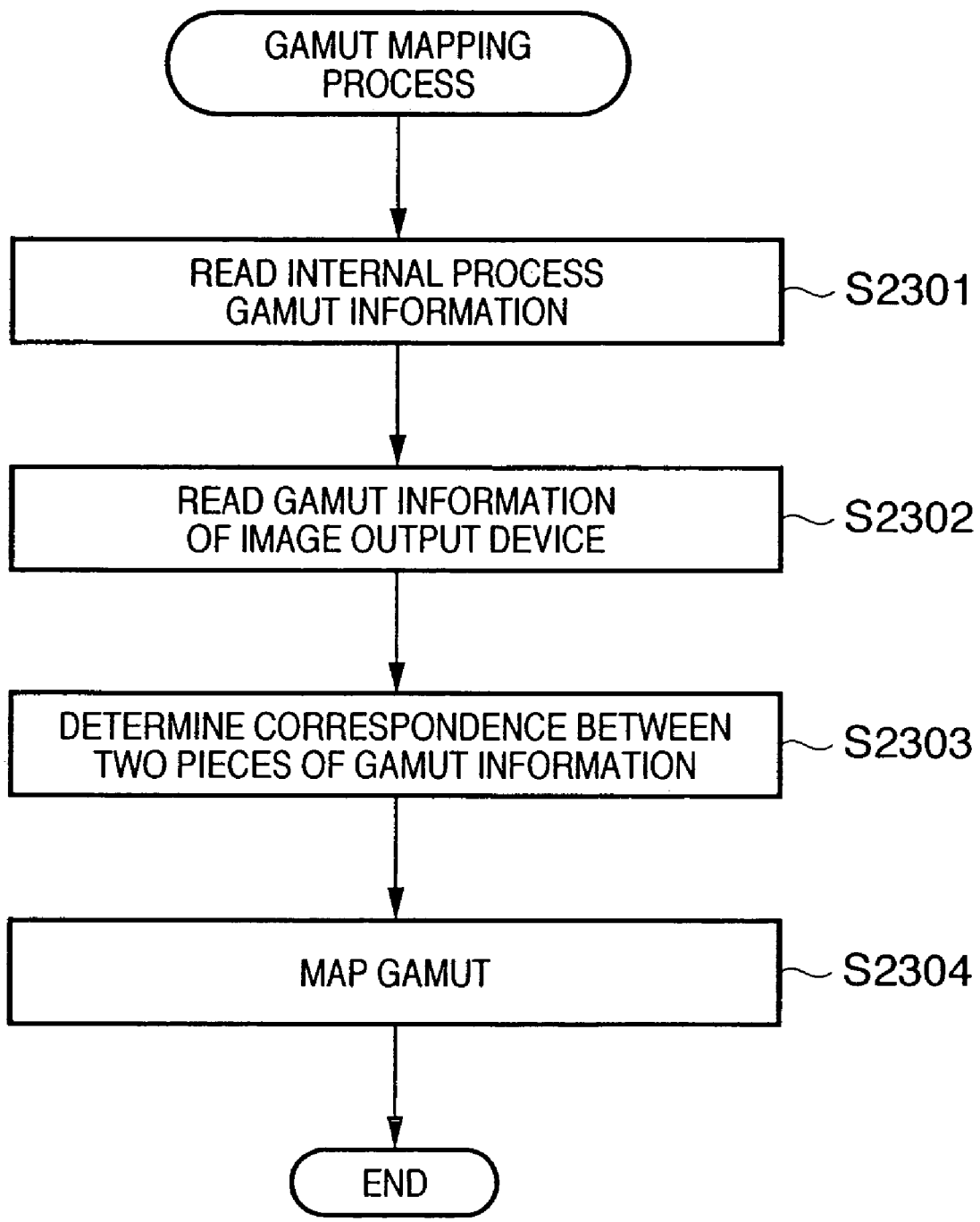

FIG. 27A

|  | R | G | B |
|---|---|---|---|
| BLACK INFORMATION | ##.## | ##.## | ##.## |
| WHITE INFORMATION | ##.## | ##.## | ##.## |

FIG. 27B

| L | C | h |
|---|---|---|
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |
| ##.## | ##.## | ##.## |

FIG. 33

| COLOR EXPRESSION SPACE INFORMATION |
|---|
| COLOR CONVERSION WORK SPACE INFORMATION |
| IMAGE DATA |

IMAGE PROCESSING APPARATUS AND METHOD

CROSS REFERENCE TO RELATED APPLICATION

This is a Continuation of application PCT/JP2003/011047 filed on Aug. 29, 2003, and published as WO 2004/028143 A1 on Apr. 1, 2004, the priority of which is claimed herein (35 U.S.C. § 120) and which claims priority of Japanese Application No. 2002-255244 filed Aug. 30, 2002, and Japanese Application No. 2002-279371 filed Sep. 25, 2002, the priority of which is also claimed herein (35 U.S.C. § 119). International Application PCT/JP2003/011047 is incorporated by reference herein in its entirety, as if fully set forth herein.

TECHNICAL FIELD

The present invention relates to an image processing apparatus and method and, for example, to an image process for processing image data between image input/output devices.

BACKGROUND ART

Along with the popularization of personal computers, it has become easy to input an image by an image input device such as a digital camera, color scanner, or the like, to display and confirm that image using an image display device such as a CRT, LCD, or the like, to apply an edit process, modification process, retouching process, and the like to the image in accordance with the intended purpose, and to output the image using an image output device such as a color printer or the like. Also, an image sensed by a digital camera is often directly output from a color printer without being displayed on a color monitor. Of course, when a CG image created on a computer is output by a color printer, no image input device is required.

Image input/output devices such as a digital camera, color scanner, color monitor, color printer, and the like have different color reproduction characteristics and ranges. In order to match color reproduction between image input/output devices, a standard color space is used as a color space to exchange color signals between devices to execute a color process that places an importance on gradation (tincture), vividness, color difference, or the like in correspondence with the input/output purpose or application of an image.

As a standard color space used to exchange color signals between devices, sRGB as a monitor color space is known. The gamut of the sRGB color space is narrower than that of an ink-jet printer. As standard color spaces having broader gamuts, sYCC, bg-sRGB, scRGB, and the like are known. However, these color spaces have broad gamuts beyond the human visible range (visual limit range), but do not define handling of data outside the visual limit range.

The human visible range (visual limit range) indicates a region in the xy chromaticity diagram, which is surrounded in a spectrum locus and a purple boundary, and indicates a color reproduction range which is a visible range of the human.

As for handling of data outside a gamut, Japanese Patent Laid-Open No. 4-186969 discloses an example wherein when a color outside the gamut of an image output device is input, color conversion that attaches an importance on color differences and converts the input color into a color which is closest to the input color (i.e., a color having a minimum color difference) within the gamut of the image output device is executed. However, the technique disclosed in this reference not only does not check whether the input color falls inside or outside the visual limit range, but also does not consider the tincture of original input data since that technique simply converts a color outside the gamut of the image output device into a color having a minimum color difference.

As for handling of extended-gamut digital image data, Japanese Patent Laid-Open No. 2002-27275 obtains a digital image of a preservation space by adjusting the color value of an extended-gamut digital image to fall within a limited gamut, and expressing the limited-gamut digital image within a preservation color space. Then, this technique determines a residual image that indicates the difference between the extended-gamut digital image and limited-gamut digital image to associate them with the digital image of the preservation space. However, in the contents of Japanese Patent Laid-Open No. 2002-27275, a preservation image and residual image are used to preserve a target image, and how to handle color space in an image process between color input/output devices that handle a color image with a broad gamut is not specified.

DISCLOSURE OF INVENTION

The present invention has been made to solve the aforementioned problems individually or together, and has as its object to appropriately handle image data outside a gamut.

It is another object of the present invention to allow to set color conversion in consideration of the tincture of image data outside a gamut.

In order to achieve the above objects, a preferred embodiment of the present invention discloses an image processing method of processing image data between devices which input/output an image, comprising the steps of: inputting image data; determining whether or not the input image data falls outside the human visible range; and converting the image data which is determined to fall outside the range to a color on an inframarginal portion of or inside the range.

It is still another object of the present invention to allow a color image process which independently uses a color expression space and a color space for a color conversion process upon exchanging image data between color image input/output devices or upon executing image processes such as color conversion and the like.

In order to achieve the above object, a preferred embodiment of the present invention discloses an image processing method, comprising the steps of: inputting a color data represented by a first color space which includes the human visible range; converting the input color data into a second color space for a color conversion process which includes a gamut of a first device; performing the color conversion process on the color data converted into the second color space; and converting the color data, which has undergone the color conversion process, into the first color space, and outputting the color data converted into the first color space.

Other features and merits of the present invention will be apparent from the following description taken in conjunction with the accompanying drawings.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIGS. 4A and 4B show an example of visual limit range information stored in a visual limit range storage unit;

FIGS. 12A and 12B show an example of internal process gamut information, which is stored in an internal process gamut storage unit;

FIG. 17 is a flow chart showing a process for mapping an internal process gamut to the gamut of an image output device;

FIGS. 27A and 27B show an example of color conversion work space range information;

FIG. 33 shows an example of image data in the seventh embodiment.

BEST MODE FOR CARRYING OUT THE INVENTION

An image processing apparatus and method according to preferred embodiments of the present invention will be described in detail hereinafter with reference to the accompanying drawings.

First Embodiment

[Arrangement]

Figure 1:
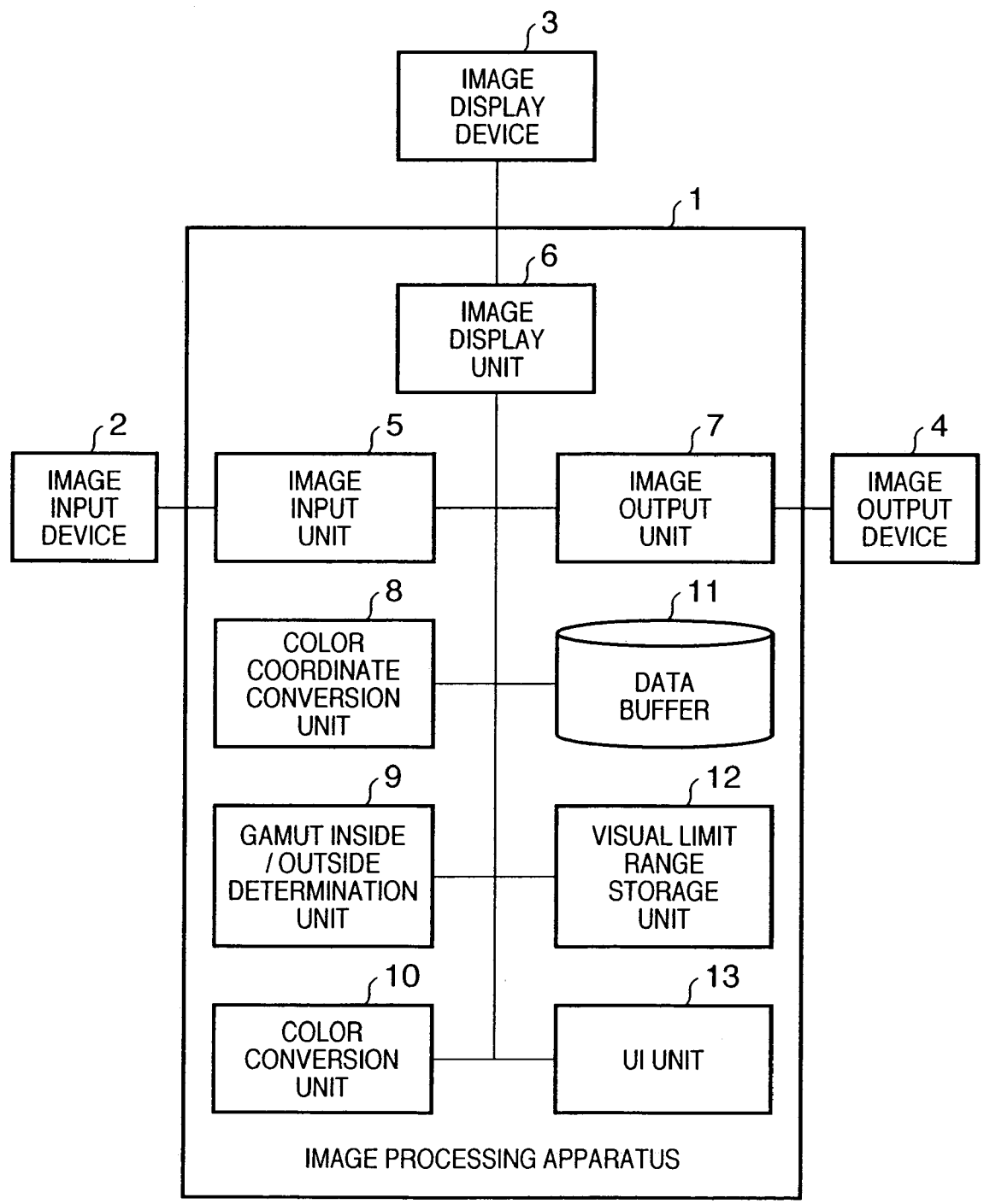
FIG. 1 is a block diagram showing the arrangement of an image processing apparatus according to an embodiment.

FIG. 1 is a block diagram showing the arrangement of an image processing apparatus 1 of this embodiment.

To the image processing apparatus 1, an image input device 2 such as a digital camera, color scanner, or the like for inputting an image, an image display device 3 such as a CRT, LCD, or the like for displaying an image, and an image output device 4 such as a color printer or the like for outputting an image are connected.

In the image processing apparatus 1, an image input unit 5 is an interface such as a USB, IEEE1394, or the like, which inputs a color signal from the image input device 2. An image display unit 6 is a video interface which generates a color signal to be displayed on the image display device 3. An image output unit 7 is an interface such as IEEE1284, USB, IEEE1394, or the like, which outputs a color signal to the image output device 4.

In an RGB space such as scRGB, which can express a value beyond the visual limit range, digital data such as computer graphics data or the like can be generated irrespective of whether or not it falls within the visual limit range, and often exceeds the visual limit range. Also, in an RGB space such as scRGB, which can express a value beyond the visual limit range, when image data which falls within the visual limit range undergoes a process such as an edge emphasis process, saturation-up process, or the like, which increases the saturation or lightness of pixels, the processed image data may often exceed the visual limit range.

A color coordinate conversion unit 8 converts color signal coordinates (color space) among an input color signal, display color signal, output color signal, and processed color signal. A gamut inside/outside determination unit 9 determines if an input color signal indicates a color inside or outside the visual limit range. A color conversion unit 10 converts a color signal corresponding to a color outside the visual limit range into a color of an inframarginal portion of the visual limit range.

A data buffer 11 is a memory such as a RAM or the like, which temporarily saves data for data processes. A visual limit range storage unit 12 is a nonvolatile memory such as a ROM, hard disk, or the like, which stores the visual limit range in a state wherein the Y values of XYZ values of black and white are normalized to 0 to 1, and also stores LCh values or RGB values as a three-dimensional (3D) range.

A user interface (UI) unit 13 is an interface which allows the user to operate the image processing apparatus 1. Note that an interface window generated by the UI unit 13 is displayed on the image display device 3 via the image display unit 3. User's operations on the interface window are input to the UI unit 13 via a keyboard and pointing device (not shown).

Note that the color coordinate conversion unit 8 gamut inside/outside determination unit 9, color conversion unit 10, and UI unit 13 are implemented by supplying a program to a CPU (not shown) of the image processing apparatus 1 although they may be implemented by hardware.

[Processing]

Figure 2:
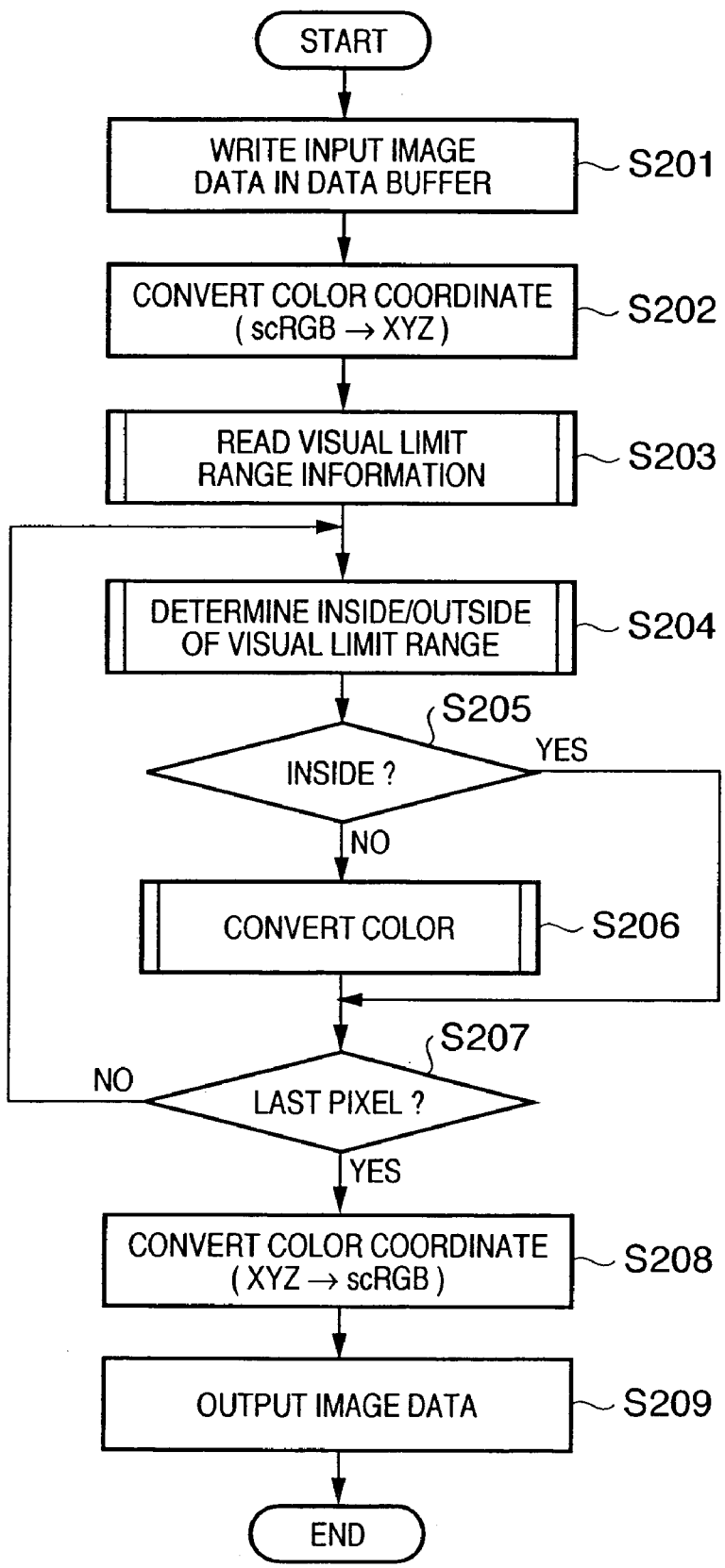
FIG. 2 is a flow chart showing an image process of the image processing apparatus.

FIG. 2 is a flow chart showing the image process of the image processing apparatus 1. This image process is executed by the CPU of the image processing apparatus 1.

When image data is input from the image input device 2 via the image input unit 5, the image data is written in the data buffer 11 (S201). The input image data undergoes color coordinate conversion into XYZ values by the color coordinate conversion unit 8 (S202). In this embodiment, sCRGB is used as color coordinate values of the input image data. Therefore, color coordinate conversion in step S202 uses:

$$R_{scRGB} = R_{scRGB(16)}/8192 - 0.5$$
$$G_{scRGB} = G_{scRGB(16)}/8192 - 0.5 \quad (1)$$
$$B_{scRGB} = B_{scRGB(16)}/8192 - 0.5$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{scRGB} \\ G_{scRGB} \\ B_{scRGB} \end{bmatrix} \quad (2)$$

Visual limit range information is read out from the visual limit range storage unit 12 (S203), and the gamut inside/outside determination unit 9 determines whether the image data which has undergone the color coordinate conversion falls inside or outside the visual limit range (S204). If the determination result indicates that the image data falls within the visual limit range, the flow jumps to step S207; otherwise, the flow advances to step S206 (S205).

If it is determined that the image data falls outside the visual limit range, the color conversion unit 10 converts that image data into image data corresponding to a color of an inframarginal portion of the visual limit range, and writes the converted data at a corresponding location on the data buffer 11 (S206). It is then determined if image data to be processed corresponds to the last pixel of the input image data (S207). If the image data to be processed does not correspond to the last pixel, the flow returns to step S204.

If the image data corresponds to the last pixel, the color coordinate conversion unit 8 executes color coordinate conversion of the image data stored in the data buffer 11 from XYZ values into output color signal coordinate values (S208). In this embodiment, scRGB is used as output color coordinate values. Therefore, the color coordinate conversion uses:

$$\begin{bmatrix} R_{scRGB} \\ G_{scRGB} \\ B_{scRGB} \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \begin{bmatrix} X \\ Y \\ Z \end{bmatrix} \quad (3)$$

-continued
$$R_{scRGB(16)} = R_{scRGB} \times 8192 + 4096$$
$$G_{scRGB(16)} = G_{scRGB} \times 8192 + 4096 \quad (4)$$
$$B_{scRGB(16)} = B_{scRGB} \times 8192 + 4096$$

The image data stored in the data buffer 11 is output to the image display device 3 or image output device 4 via the image display unit 6 or image output unit 7 (S209), thus ending the process.

[Visual Limit Range Information]

Figure 3:
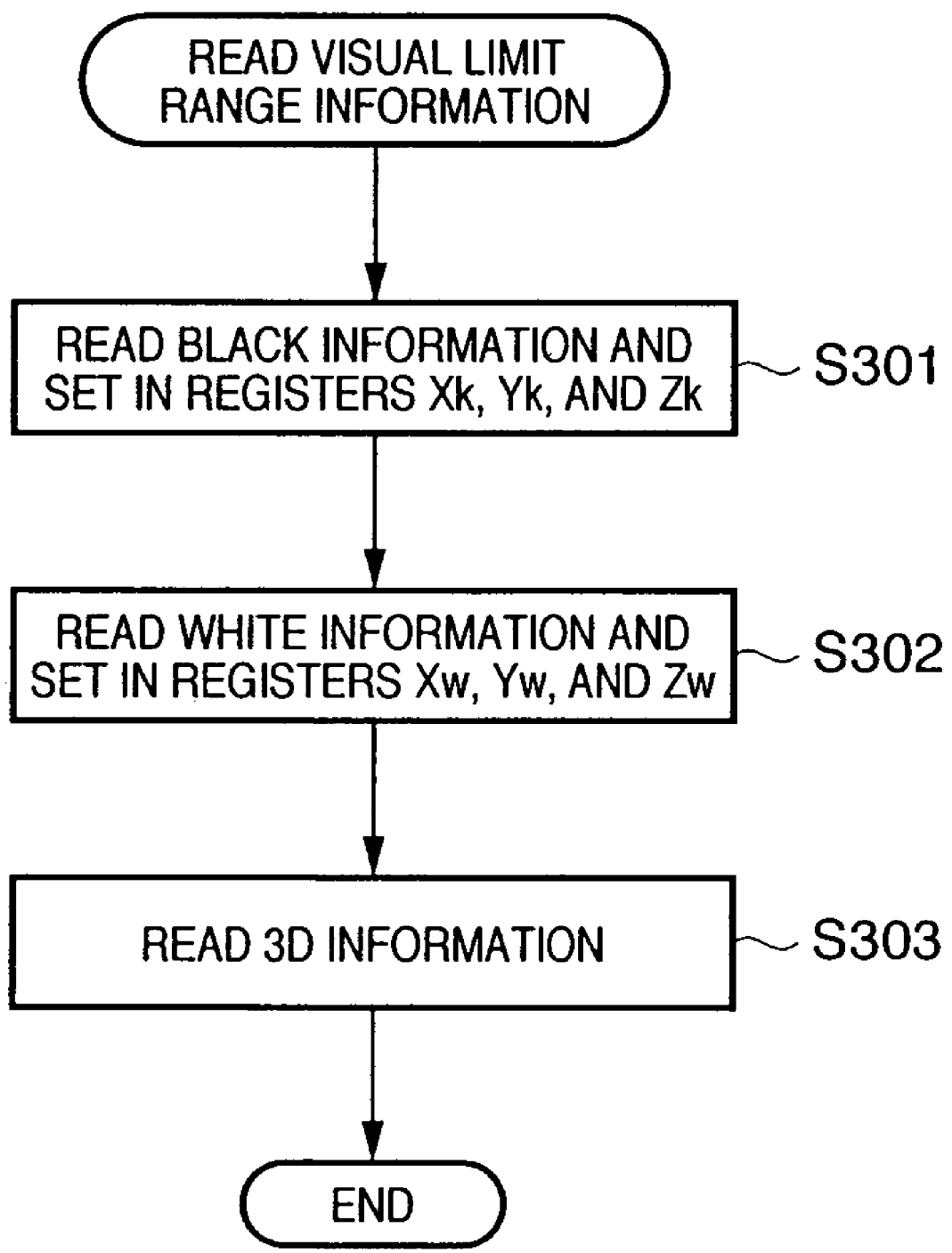
FIG. 3 is a flow chart showing a process for reading visual limit range information.

FIG. 3 is a flow chart showing the process for reading the visual limit range information in step S203.

The XYZ values of black as the lower limit of the visual limit range are read from the visual limit range storage unit 12, and are set in registers Xk, Yk, and Zk (S301). Likewise, the XYZ values of white as the upper limit of the visual limit range are read, and are set in registers Xw, Yw, and Zw (S302). Next, 3D information (LCh values) of the visual limit range are read (S303), thus ending the process.

Figures 4A, 4B:
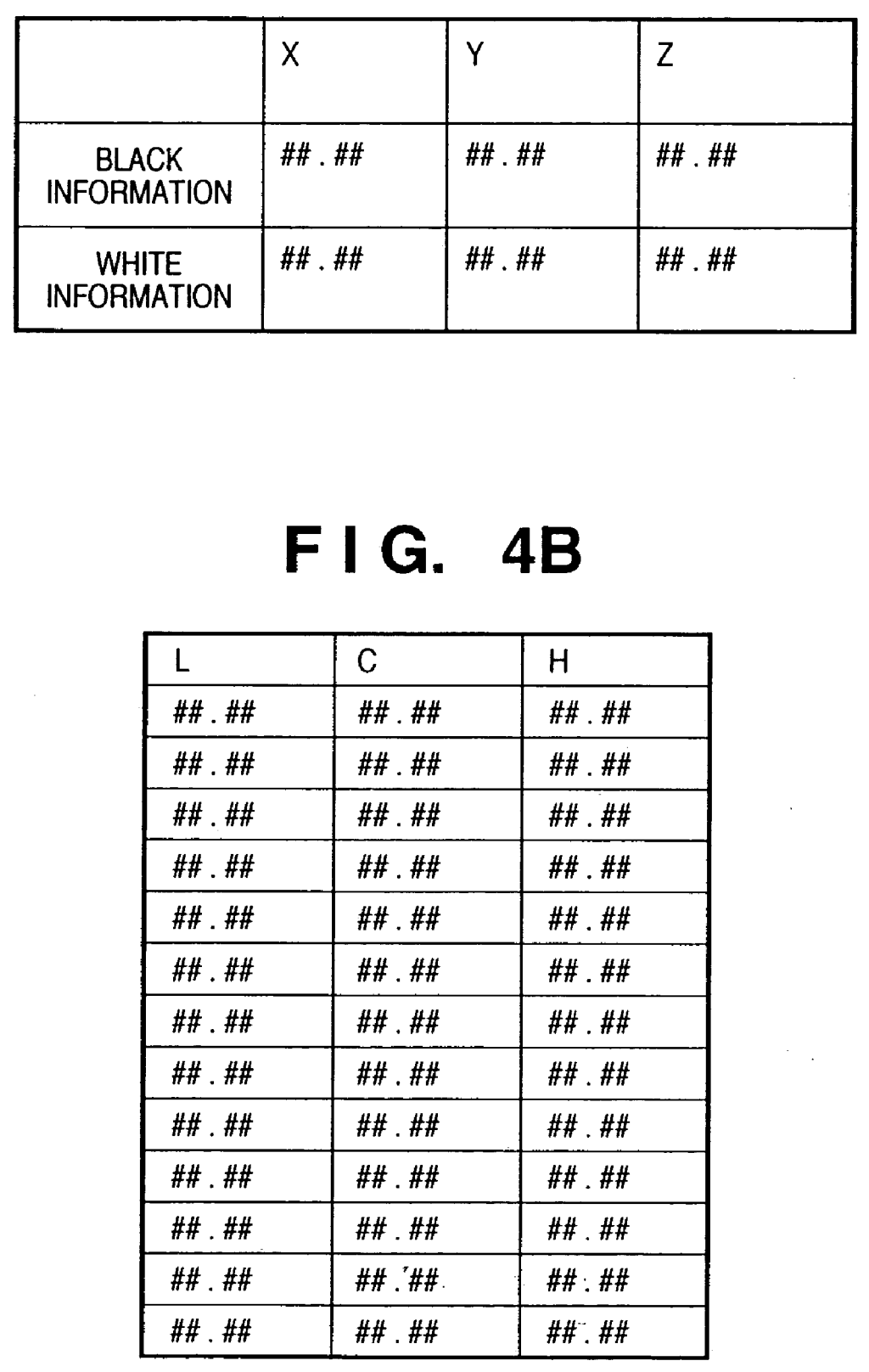

FIGS. 4A and 4B show an example of the visual limit range information stored in the visual limit range storage unit 12, and respectively show the XYZ values of black information and white information of the visual limit range (FIG. 4A) and the LCh values of 3D information of the visual limit range (FIG. 4B). For example, black information is expressed by X=0.0, Y=0.0, and Z=0.0, and white information is expressed by X=95.05, Y=100.0, and Z=108.91 in case of a D65 light source. As the 3D information, equations (5.1) to (5.4) (using D65 as white) and equation (6) are used to calculate LCh values based on XYZ values ranging from (0.0, 0.0, 0.0) to (95.05, 100.0, 108.91) and, for example, C values corresponding to maximum saturation levels in 10-step increments of L and h values are stored.

[Inside/Outside Determination of Visual Limit Range]

Figure 5:
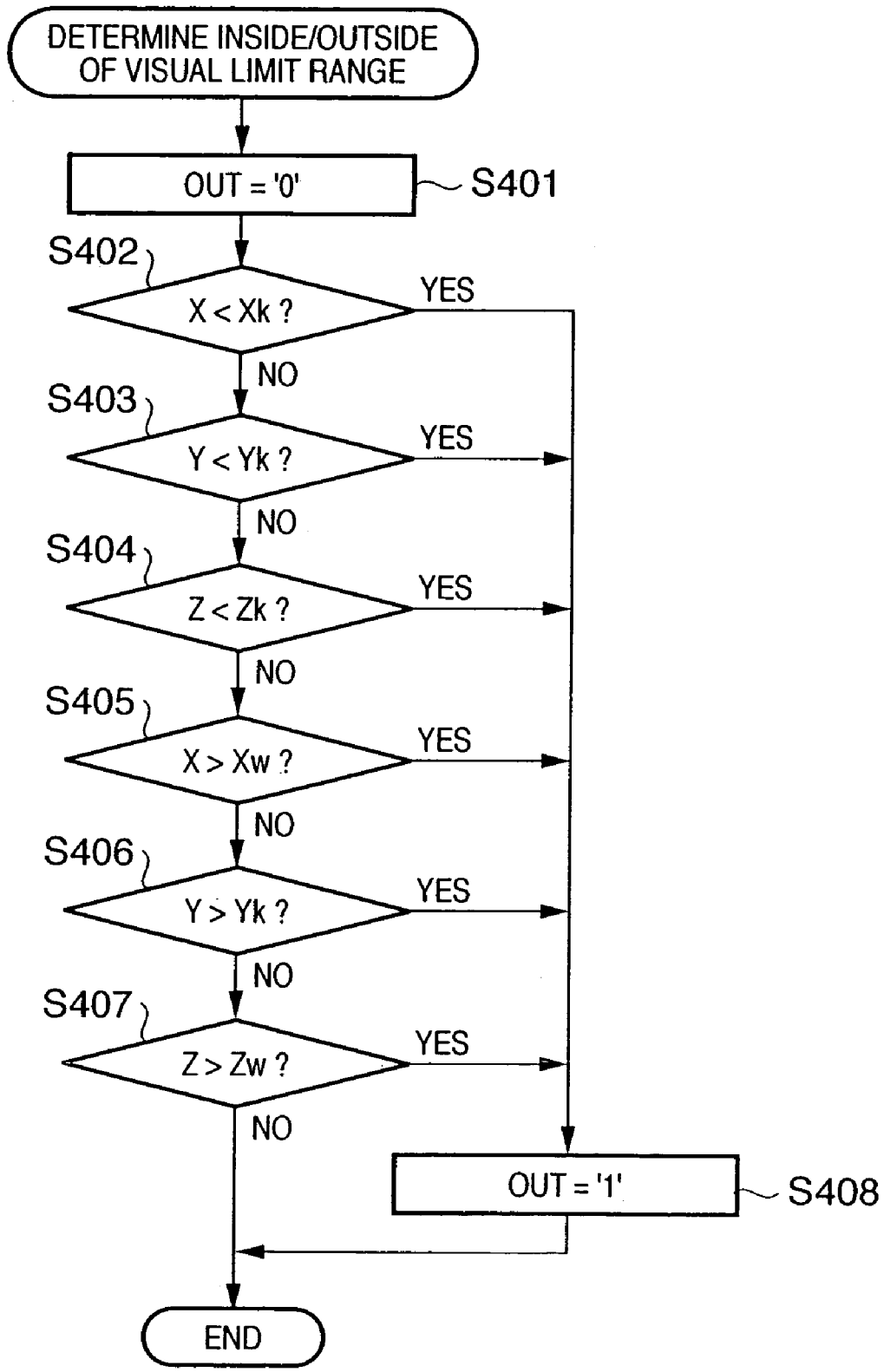
FIG. 5 is a flow chart showing a process for determining whether a color falls inside or outside a visual limit range.

FIG. 5 is a flow chart showing a process for determining whether a color falls inside or outside the visual limit range in step S204.

A gamut inside/outside determination flag OUT is initialized (S401), and it is checked if an X value of image data is smaller than the lower limit value Xk of the visual limit range (S402). Likewise, it is sequentially checked if a Y value is smaller than the lower limit value Yk (S403), if a Z value is smaller than the lower limit value Zk, if the X value is larger than the upper limit value Xw of the visual limit range (S405), if the Y value is larger than the upper limit value Yw (S406), and if the Z value is larger than the upper limit value Zw (S407). If it is determined in any of these steps that the value of interest is smaller than the lower limit value or is larger than the upper limit value, the flow advances to step S408; otherwise, the process ends.

If it is determined in any of these steps that the value of interest is smaller than the lower limit value or is larger than the upper limit value, '1' indicating outside the gamut is set in the gamut inside/outside determination flag OUT (S408), thus ending the process.

[Color Conversion]

Figure 6:
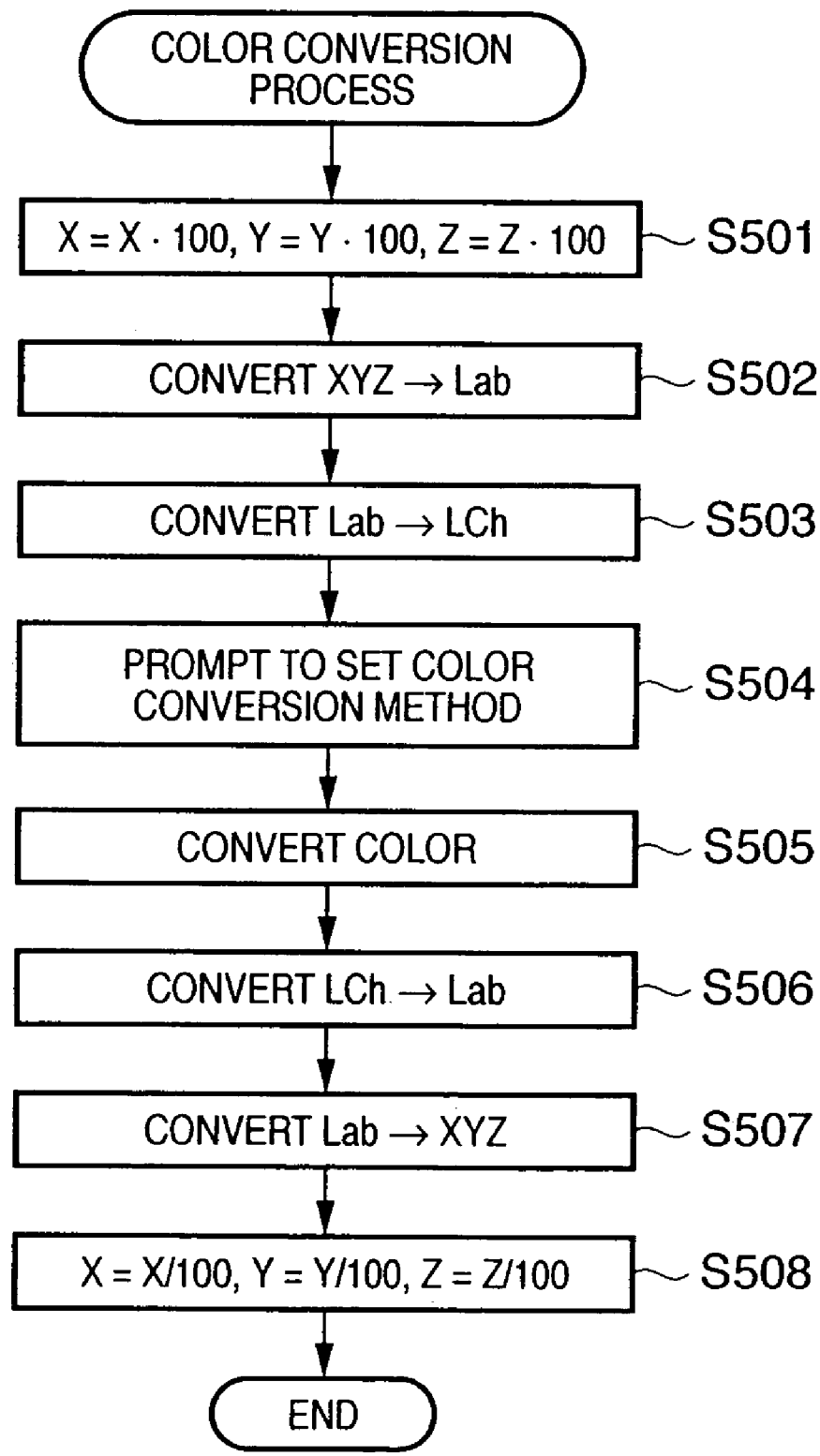
FIG. 6 is a flow chart showing a color conversion process.
Figure 7:
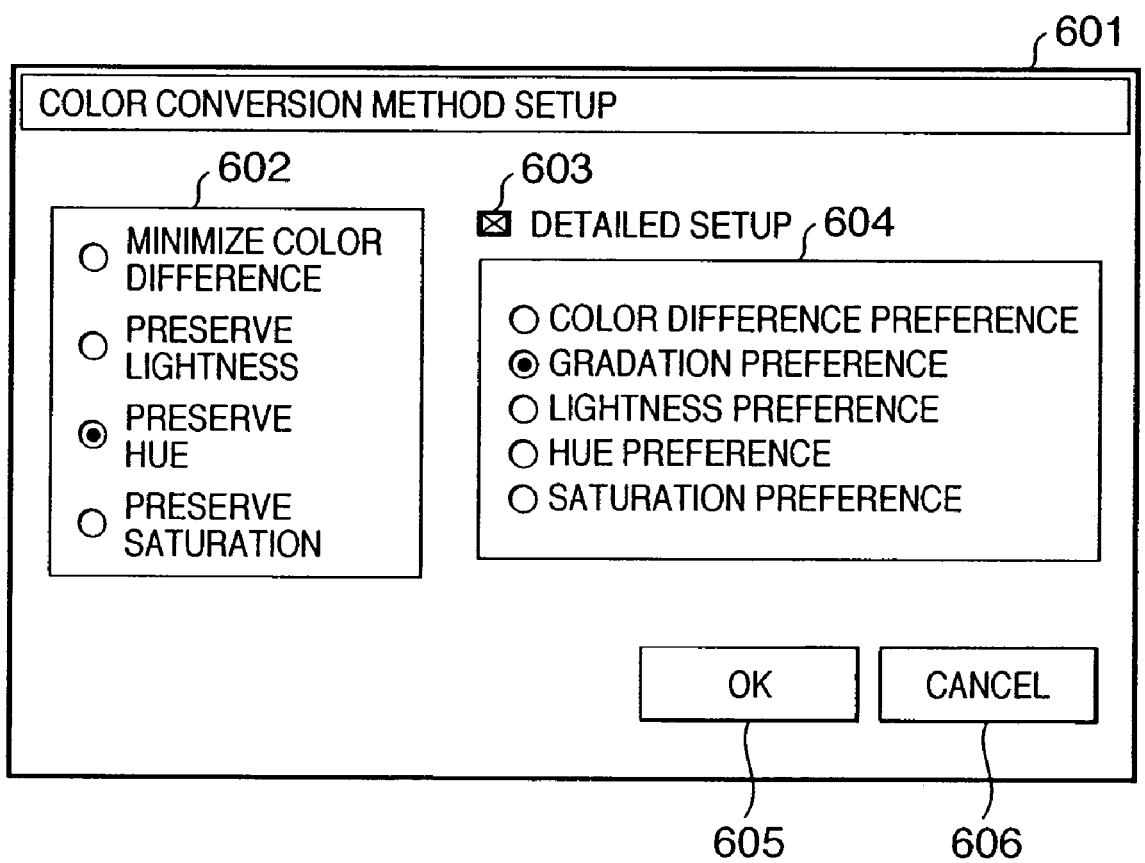
FIG. 7 shows a color conversion method setup window as a user interface window used to set a color conversion method.
Figure 8:
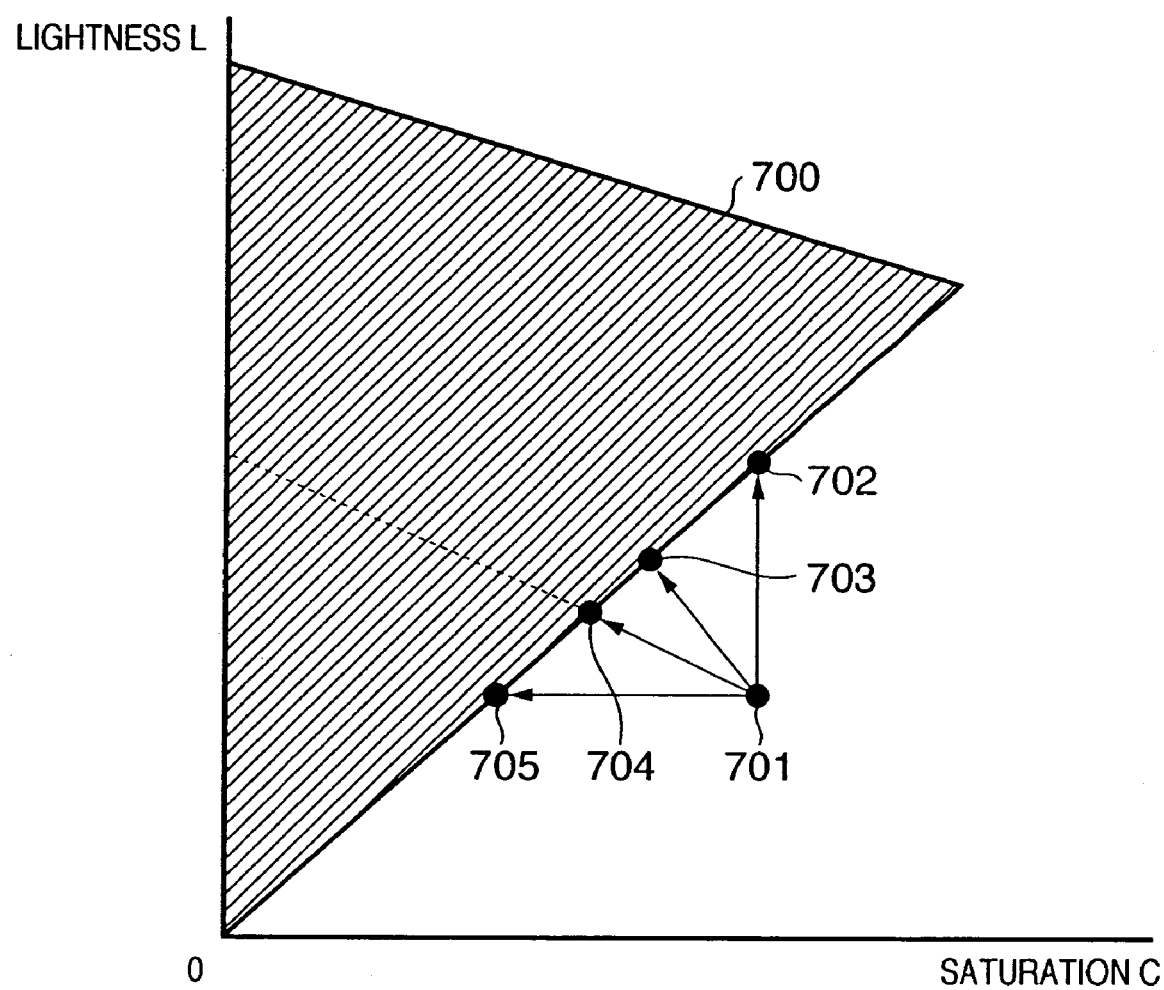
FIG. 8 is a graph for explaining the color conversion method.

FIG. 6 is a flow chart showing the color conversion process in step S206, FIG. 7 shows a color conversion method setup window 601 as a user interface window used to set a color conversion method, and FIG. 8 is a graph for explaining the color conversion method.

Since the calculation results of the above equations are scaled so that Y falls within the range from 0 to 1, XYZ values are respectively multiplied by 100 to adjust the scale (S501), and the color conversion unit 8 converts the XYZ values into Lab values (S502) by:

if $Y/Yn > 0.56$, $$L^* = 116(Y/Yn)^{1/3} \quad (5.1)$$

if $Y/Yn \leq 0.56$, $$L^* = 903.29(Y/Yn) \quad (5.2)$$

where Y: the Y value of a tristimulus value on the XYZ color system

Yn: the Y value based on standard light of a perfect reflecting diffuser $$a^* = 500[f(X/Xn) - f(Y/Yn)]$$

$$b^* = 200[f(X/Xn) - f(Z/Zn)] \quad (5.3)$$

for if $X/Xn > 0.56$, $$f(X/Xn) = (X/Xn)^{1/3}$$

if $X/Xn \leq 0.56$, $$f(X/Xn) = 7.78(X/Xn) + 16/116$$

if $Y/Yn > 0.56$, $$f(Y/Yn) = (Y/Yn)^{1/3}$$

if $Y/Yn \leq 0.56$, $$f(Y/Yn) = 7.78(Y/Yn) + 16/116$$

If $Z/Zn > 0.56$, $$f(Z/Zn) = (Z/Zn)^{1/3}$$

if $Z/Zn \leq 0.56$, $$f(Z/Zn) = 7.78(Z/Zn) + 16/116 \quad (5.4)$$

where

X, Y, and Z: tristimulus values X, Y, Z on the XYZ color system

Xn, Yn, and Zn: X, Y, and Z values based on standard light of the perfect reflecting diffuser.

Note that the conversion in step S502 uses Xn=95.05, Yn=100.0, and Zn=108.91 since D65 is used as white. Next, the color coordinate conversion unit 8 converts the Lab values into LCh values (S503) using:

$$L = L^*$$

$$C_{ab} = \sqrt{(a^{*2} + b^{*2})}$$

$$h_{ab} = \tan^{-1}(b^*/a^*) \quad (6)$$

A user interface shown in FIG. 7 is presented to make the user set a color conversion method (S504). A color conversion method setup window 601 includes a basic setup window 602 used to select a basic color conversion method. When the user wants to set the color conversion method in more detail (to set a preferential conversion method in addition to the basic setup), he or she checks a detailed setup check box 603 and selects a preferential conversion condition using radio buttons on a detailed setup window 604. Note that "hue preservation" is selected as basic color conversion, and "gradation preference" is selected as the conversion condition in the example of FIG. 7.

Upon completion of the setups, the user presses an "OK" button 605. If the user wants to cancel the setups, he or she presses a "cancel" button 606.

The color conversion unit 10 executes color conversion in accordance with the set color conversion method (and conversion condition) (S505). FIG. 8 shows the color conversion executed in step S505, and shows a color conversion direction when "hue preservation" is selected as the basic color conversion method. Note that the ordinate plots lightness L, and the abscissa plots saturation C and also a visual limit range 700 read in step S303.

In FIG. 8, when "saturation preference" is selected, an input color 701 is converted into a color on an inframarginal portion 702 of the visual limit range 700 so as not to change saturation. Likewise, when "color difference preference" is selected, the input color 701 is converted into a color on an inframarginal portion 703 so as to minimize the color difference; when "gradation preference" is selected, the input color 701 is converted into a color on an inframarginal portion 704 so as not to change gradation; or when "lightness preference" is selected, the input color 701 is converted into a color on an inframarginal portion 705 so as not to change lightness.

The color coordinate conversion unit 8 converts the LCh values that have undergone the color conversion into Lab values using an inverse conversion equation of equation (6) (S506), converts the Lab values into XYZ values using inverse conversion equations of equations (5.1) to (5.4) (S507), and divides the XYZ values by 100 to set the original scale (S508), thus ending the process.

As described above, it is checked using black information and white information of the visual limit range whether or not input color data falls inside or outside the visual limit range, and color data outside the visual limit range undergoes color conversion in accordance with the conversion method (and conversion condition) set by the user. Hence, the color outside the visual limit range can be converted into a color on the inframarginal portion of the visual limit range while preserving tincture or the like as much as possible.

Mapping into the visual limit range is required to convert a pixel having a color outside the visual limit range into that having a color inside the visual limit range, since image data must be finally visually observed by a person. If mapping of the first embodiment is not made, since a conversion destination within the visual limit range of a color outside the visual limit range is unknown, that color alone is converted into a different color, and connection with surrounding pixels deteriorates, thus considerably impairing the image quality. When the color conversion process of gradation-preferential hue preservation is executed like in the first embodiment, a color outside the visual limit range is processed so as not to change its tincture as much as possible. Hence, connection with surrounding pixels can be prevented from deteriorating.

Second Embodiment

An image processing apparatus according to the second embodiment of the present invention will be described below. Note that the same reference numerals in the second embodiment denote the same parts as in the first embodiment, and a detailed description thereof will be omitted.

[Arrangement]

Figure 9:
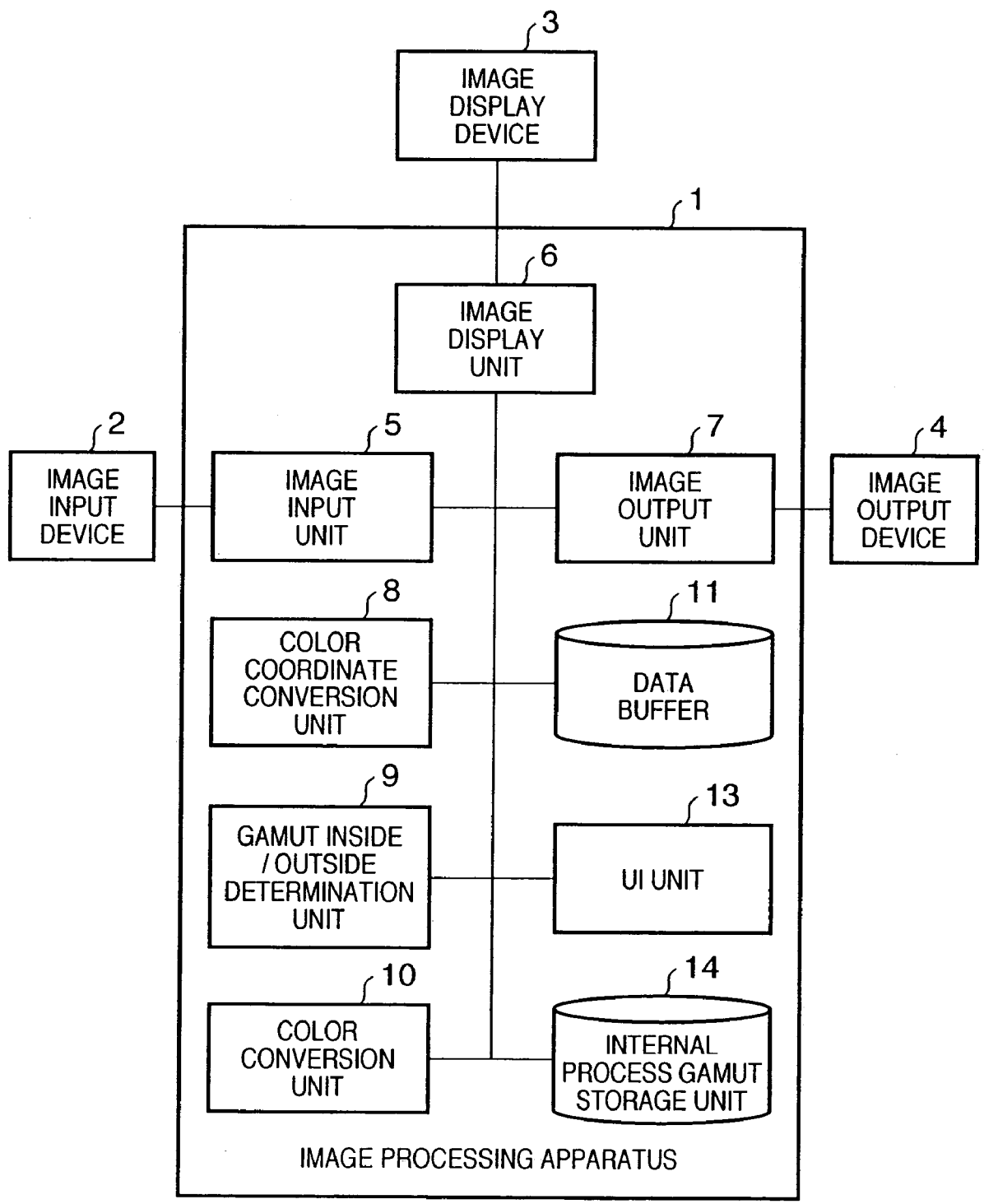
FIG. 9 is a block diagram showing the arrangement of an image processing apparatus according to the second embodiment.

FIG. 9 is a block diagram showing the arrangement of the image processing apparatus 1 of the second embodiment.

An internal process gamut storage unit 14 is a nonvolatile memory such as a ROM, hard disk, or the like, which stores an internal process gamut having three, R, G, and B points as vertices. Note that the internal process gamut storage unit 14 stores the RGB values of black and white, which are normalized to 0 to 1, as will be described in detail later. Also, the unit 14 stores LCh values as a 3D range.

[Processing]

Figure 10:
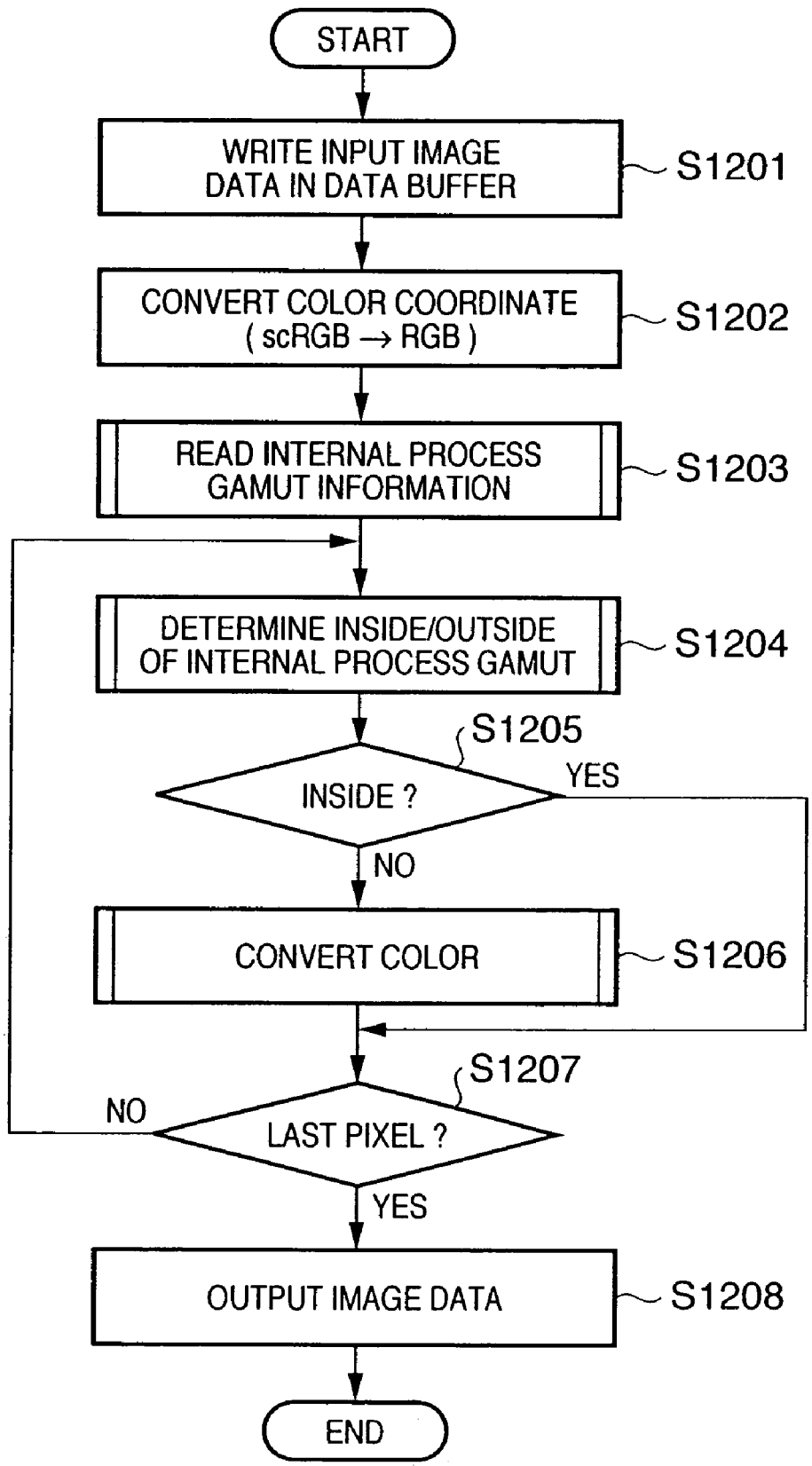
FIG. 10 is a flow chart showing an image process of the image processing apparatus.

FIG. 10 is a flow chart showing the image process of the image processing apparatus 1. This image process is executed by the CPU of the image processing apparatus 1.

When image data is input from the image input device 2 via the image input unit 5, the image data is written in the data buffer 11 (S1201). The input image data undergoes color coordinate conversion into internal process RGB values via XYZ values by the color coordinate conversion unit 8 (S1202). In this embodiment, scRGB is used as color coordinate values of the input image data. Therefore, color coordinate conversion in step S1202 uses equations (1) and (2), and:

$$\begin{bmatrix} R \\ G \\ B \end{bmatrix} = \begin{bmatrix} a11 & a12 & a13 \\ a21 & a22 & a23 \\ a31 & a32 & a33 \end{bmatrix} \begin{bmatrix} X \\ Y \\ Z \end{bmatrix} \quad (7)$$

Note that the converted RGB value may undergo a gamma conversion process as needed.

Gamut information of an internal process color signal is read out from the internal process gamut storage unit 14 (S1203), and the gamut inside/outside determination unit 9 determines whether the image data which has undergone the color coordinate conversion falls inside or outside the internal process gamut (S1204). If the determination result indicates that the image data falls within the internal process gamut, the flow jumps to step S1207; otherwise, the flow advances to step S1206 (S1205).

If it is determined that the image data falls outside the internal process gamut, the color conversion unit 10 converts that image data into image data corresponding to a color of an inframarginal portion of the internal process gamut, and writes the converted data at a corresponding location on the data buffer 11 (S1206). It is then determined if image data to be processed corresponds to the last pixel of the input image data (S1207). If the image data to be processed does not correspond to the last pixel, the flow returns to step S1204.

If the image data corresponds to the last pixel, the image data stored in the data buffer 11 is output to the image display device 3 or image output device 4 via the image display unit 6 or image output unit 7 (S1208), thus ending the process.

[Internal Process Gamut Information]

Figure 11:
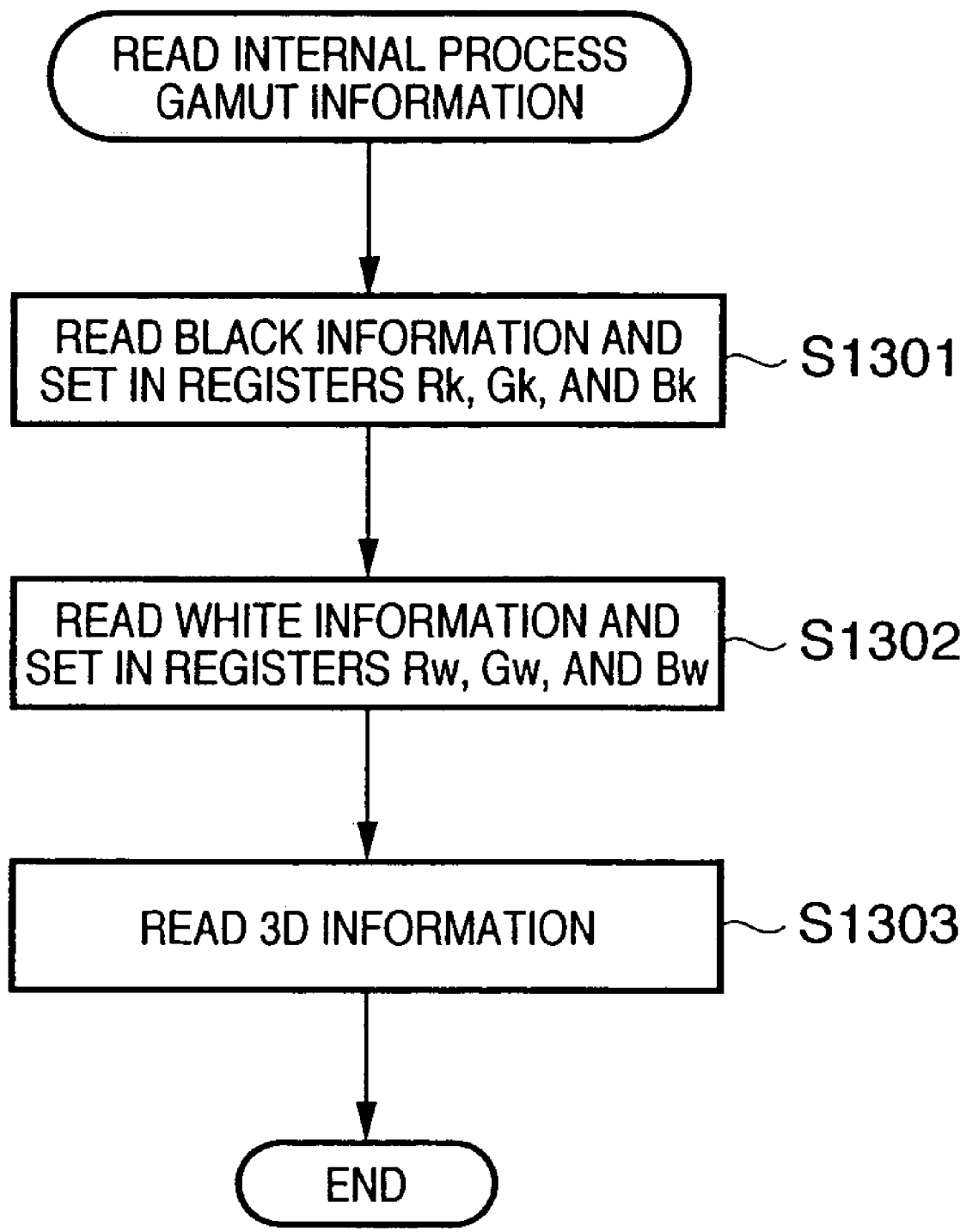
FIG. 11 is a flow chart showing a process for reading internal process gamut information.

FIG. 11 is a flow chart showing the process for reading the internal process gamut information in step S1203.

The RGB values of black as the lower limit of the internal process gamut are read from the internal process gamut storage unit 12, and are set in registers Rk, Gk, and Bk (S1301). Likewise, the RGB values of white as the upper limit of the internal process gamut are read, and are set in registers Rw, Gw, and Bw (S1302). Next, 3D information (LCh values) of the internal process gamut are read (S1303), thus ending the process.

FIGS. 12A and 12B show an example of the internal process gamut information stored in the internal process gamut storage unit 14, and respectively show the RGB values of black information and white information of the internal process gamut (FIG. 12A) and the LCh values of 3D information of the internal process gamut (FIG. 12B). For example, black information is expressed by R=0.0, B=0.0, and B=0.0, and white information is expressed by R=1.0, G=1.0, and B=1.0. As the 3D information, after XYZ values obtained by inverse conversion of equation (7) using the RGB values ranging from (0.0, 0.0, 0.0) to (1.0, 1.0, 1.0) are multiplied by 100, equations (5.1) to (5.4) (using D65 as white) and equation (6) are used to calculate LCh values based on those XYZ values and, for example, C values corresponding to maximum saturation levels in 10-step increments of L and h values are stored.

[Inside/Outside Determination of Internal Process Gamut]

Figure 13:
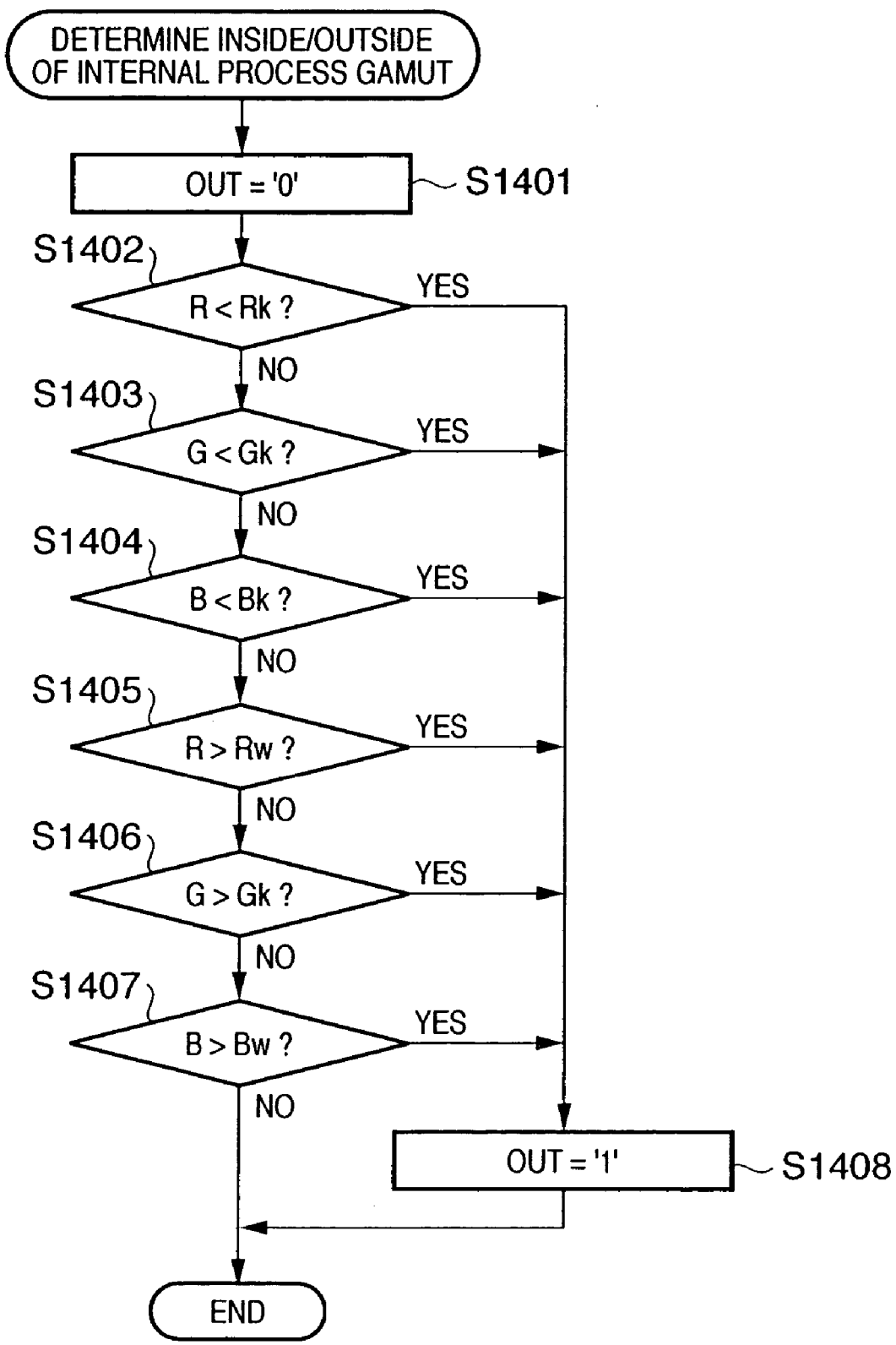
FIG. 13 is a flow chart showing a process for determining whether a color falls inside or outside an internal process gamut.

FIG. 13 is a flow chart showing the process for determining whether a color falls inside or outside an internal process gamut in step S1204.

A gamut inside/outside determination flag OUT is initialized (S1401), and it is checked if an R value of image data is smaller than the lower limit value Rk of the internal process gamut (S1402). Likewise, it is sequentially checked if a G value is smaller than the lower limit value Gk (S1403), if a B value is smaller than the lower limit value Bk, if the R value is larger than the upper limit value Rw of the internal process gamut (S1405), if the G value is larger than the upper limit value Gw (S1406), and if the B value is larger than the upper limit value Bw (S1407). If it is determined in any of these steps that the value of interest is smaller than the lower limit value or is larger than the upper limit value, the flow advances to step S1408; otherwise, the process ends.

If it is determined in any of these steps that the value of interest is smaller than the lower limit value or is larger than the upper limit value, '1' indicating outside the gamut is set in the gamut inside/outside determination flag OUT (S1408), thus ending the process.

[Color Conversion]

Figure 14:
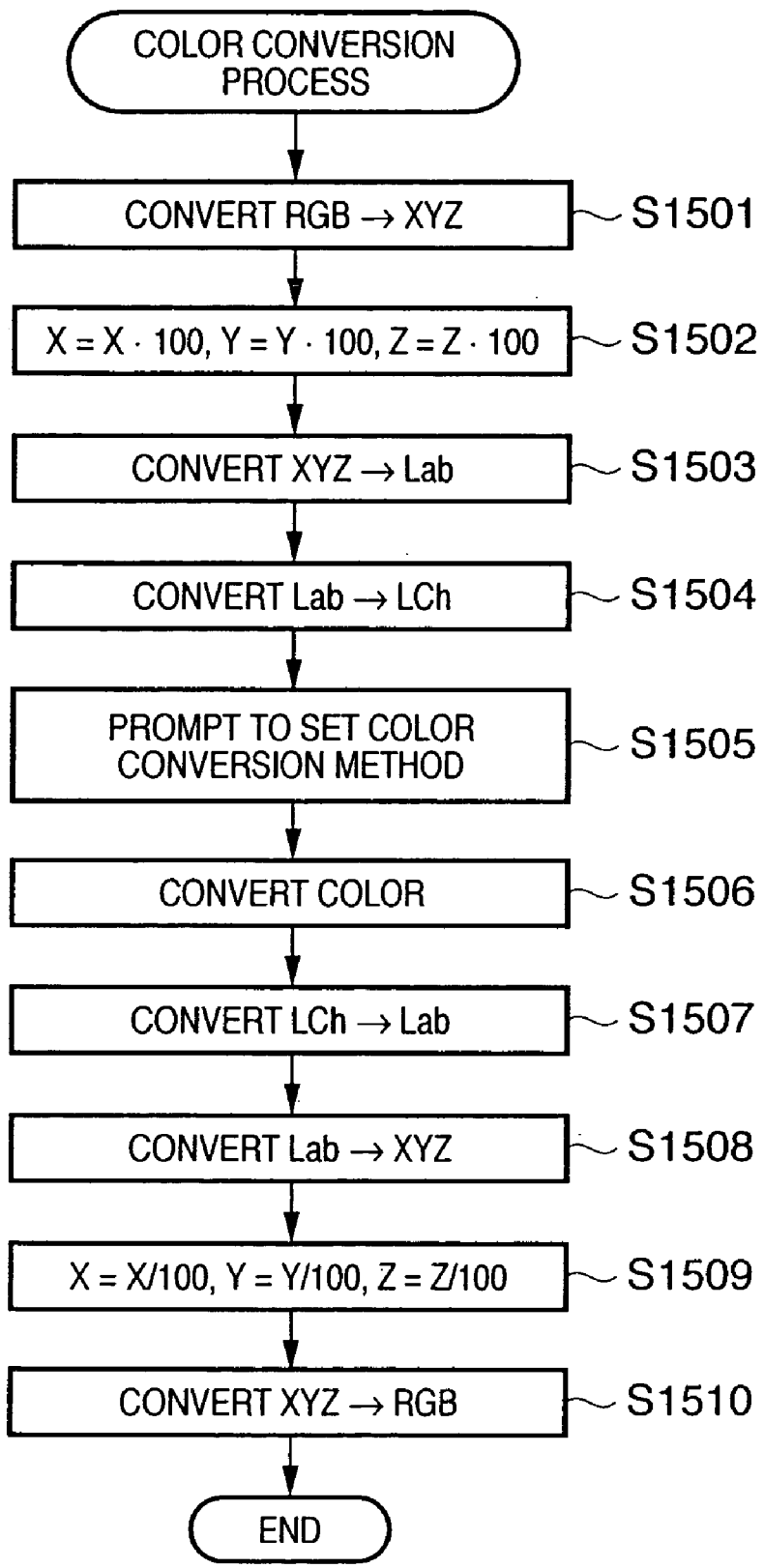
FIG. 14 is a flow chart showing a color conversion process.

FIG. 14 is a flow chart showing the color conversion process in step S1206.

The color coordinate conversion unit 8 converts the RGB values of the internal process color signal into XYZ values using the inverse conversion equation of equation (7) (S1501). As in the first embodiment, since the calculation results of the above equations are scaled so that Y falls within the range from 0 to 1, XYZ values are respectively multiplied by 100 to adjust the scale (S1502), and the color conversion unit 8 converts the XYZ values into Lab values using equations (5.1) to (5.4) (S1503). Note that the conversion in step S1503 uses Rn=95.05, Gn=100.0, and Bn=108.91 since D65 is used as white.

Next, the color coordinate conversion unit 8 converts the Lab values into LCh values using equation (6) (S1504), and the user interface shown in FIG. 7 is presented to make the user set a color conversion method (S1505). Then, the color conversion unit 10 executes color conversion in accordance with the set color conversion method (S1506).

The color coordinate conversion unit 8 converts the LCh values that have undergone the color conversion into Lab values using an inverse conversion equation of equation (6) (S1507), converts the Lab values into XYZ values using inverse conversion equations of equations (5.1) to (5.4) (S1508), and divides the XYZ values by 100 to set the original scale (S1509).

Finally, the color coordinate conversion unit 8 converts the XYZ values into RGB values of the internal process color signal using equation (7), thus ending the process.

In this manner, it is determined using black information and white information of the internal process gamut whether input color data falls inside or outside the internal process gamut, and the color data which falls outside the internal process gamut undergoes color conversion in accordance with the conversion method (and conversion condition) set by the user. Hence, a color that falls outside the internal process gamut can be converted into a color on the inframarginal portion of the internal process gamut while preserving its tincture as much as possible.

Third Embodiment

An image processing apparatus according to the third embodiment of the present invention will be described below. Note that the same reference numerals in the third embodiment denote the same parts as in the first embodiment, and a detailed description thereof will be omitted.

[Arrangement]

Figure 15:
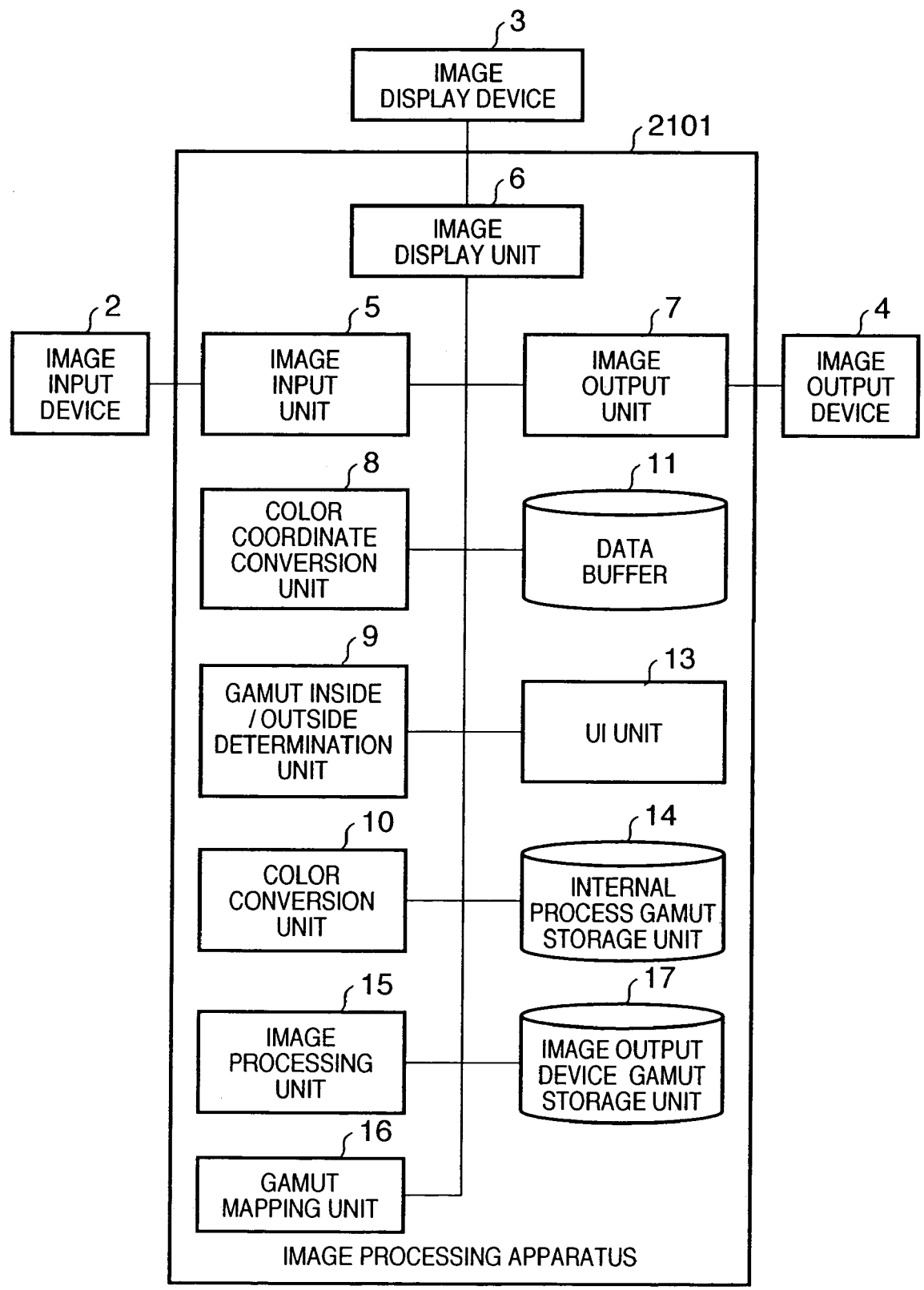
FIG. 15 is a block diagram showing the arrangement of an image processing apparatus according to the third embodiment.

FIG. 15 is a block diagram showing the arrangement of the image processing apparatus 1 of the third embodiment.

An image processing unit 15 executes image processes such as color correction and the like. A gamut mapping unit 16 maps the internal process gamut to the gamut of the image output device 4. An image output device gamut storage unit 17 stores LCh values as a 3D range, i.e., the gamut of the image output device 4, as will be described in detail later.

[Processing]

Figure 16:
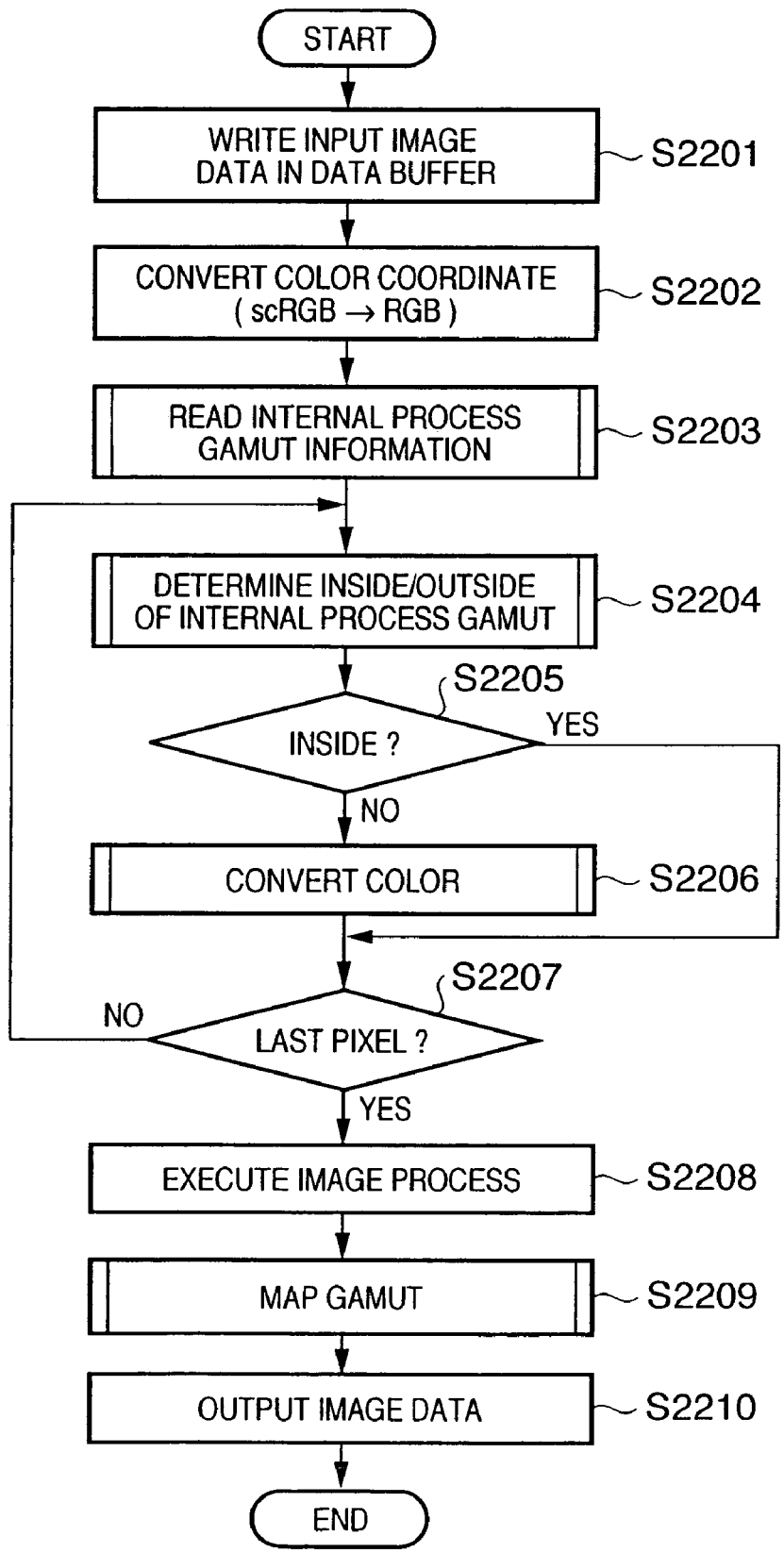
FIG. 16 is a flow chart showing an image process of the image processing apparatus.
Figure 18A:
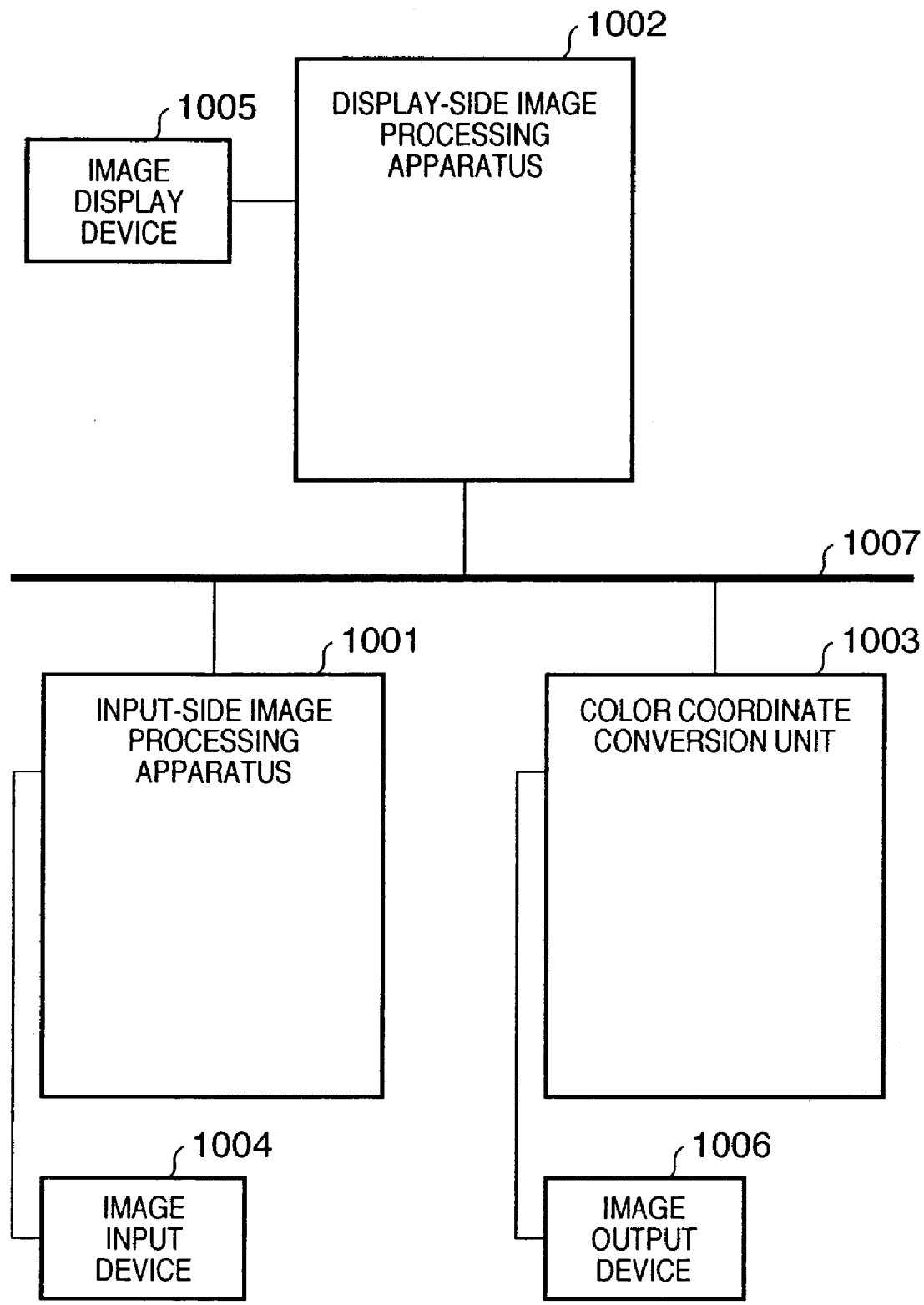
FIGS. 18A to 18D are block diagrams of an image processing apparatus according to the fourth embodiment.
Figure 18B:
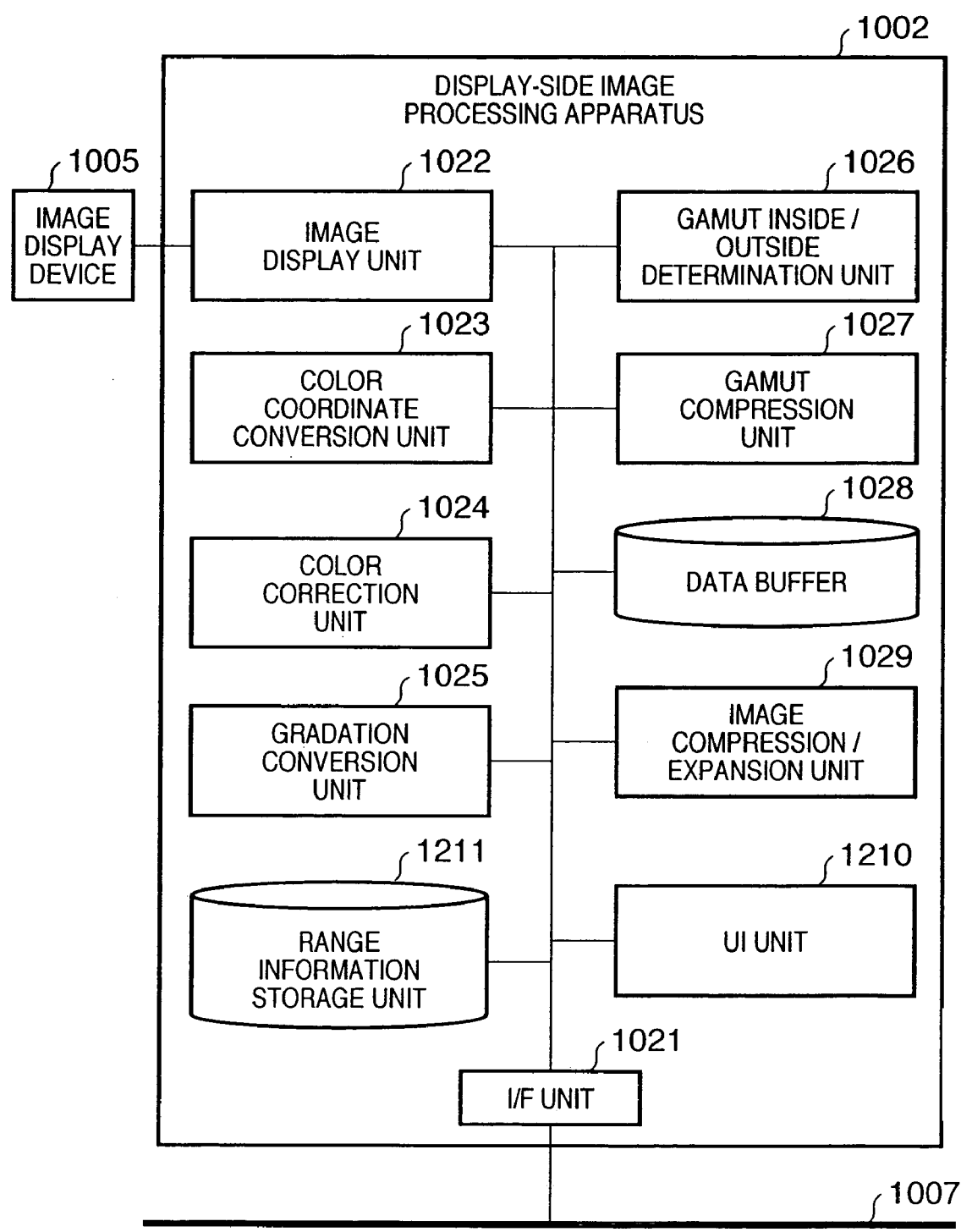
Figure 18C:
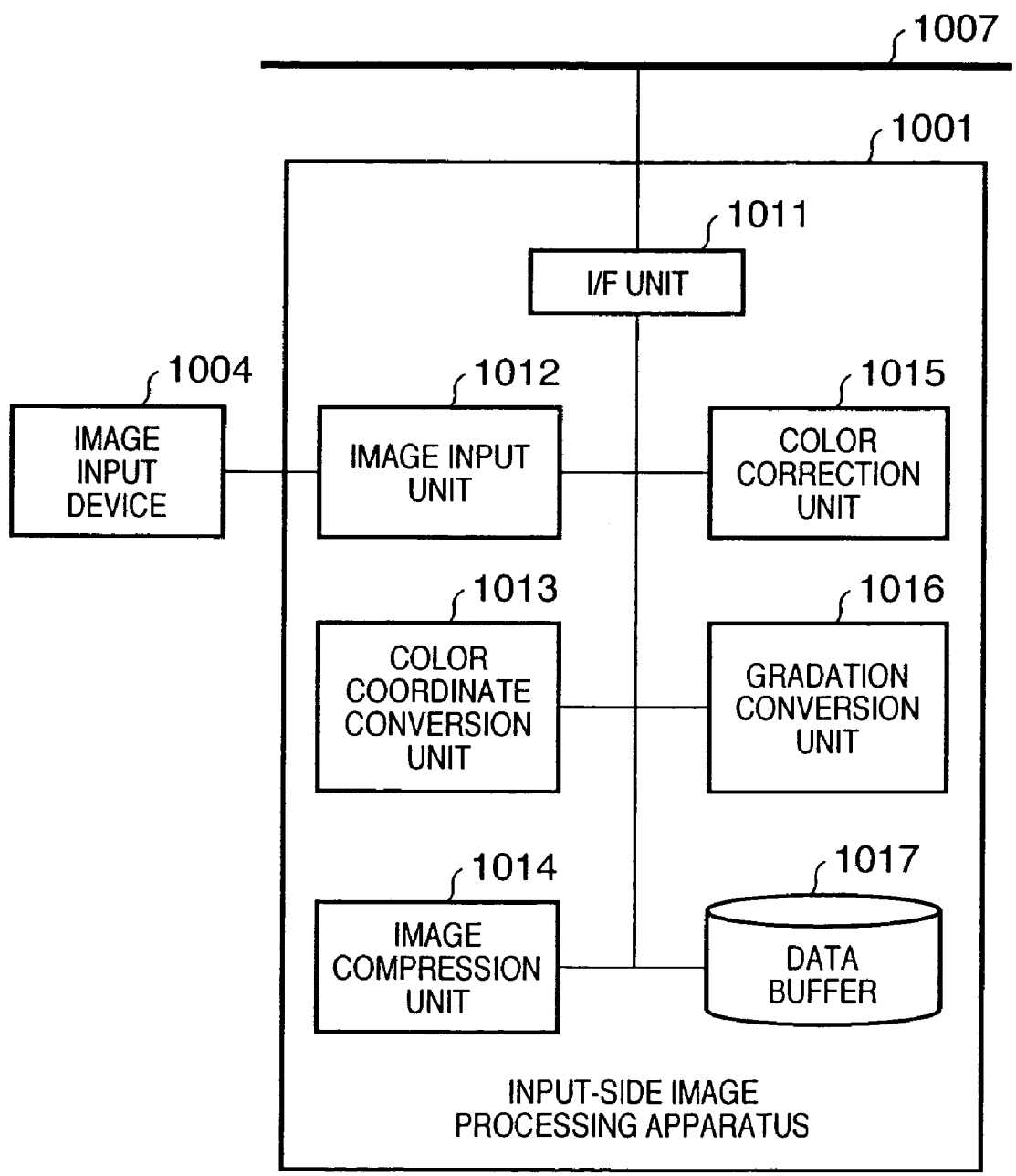
Figure 18D:
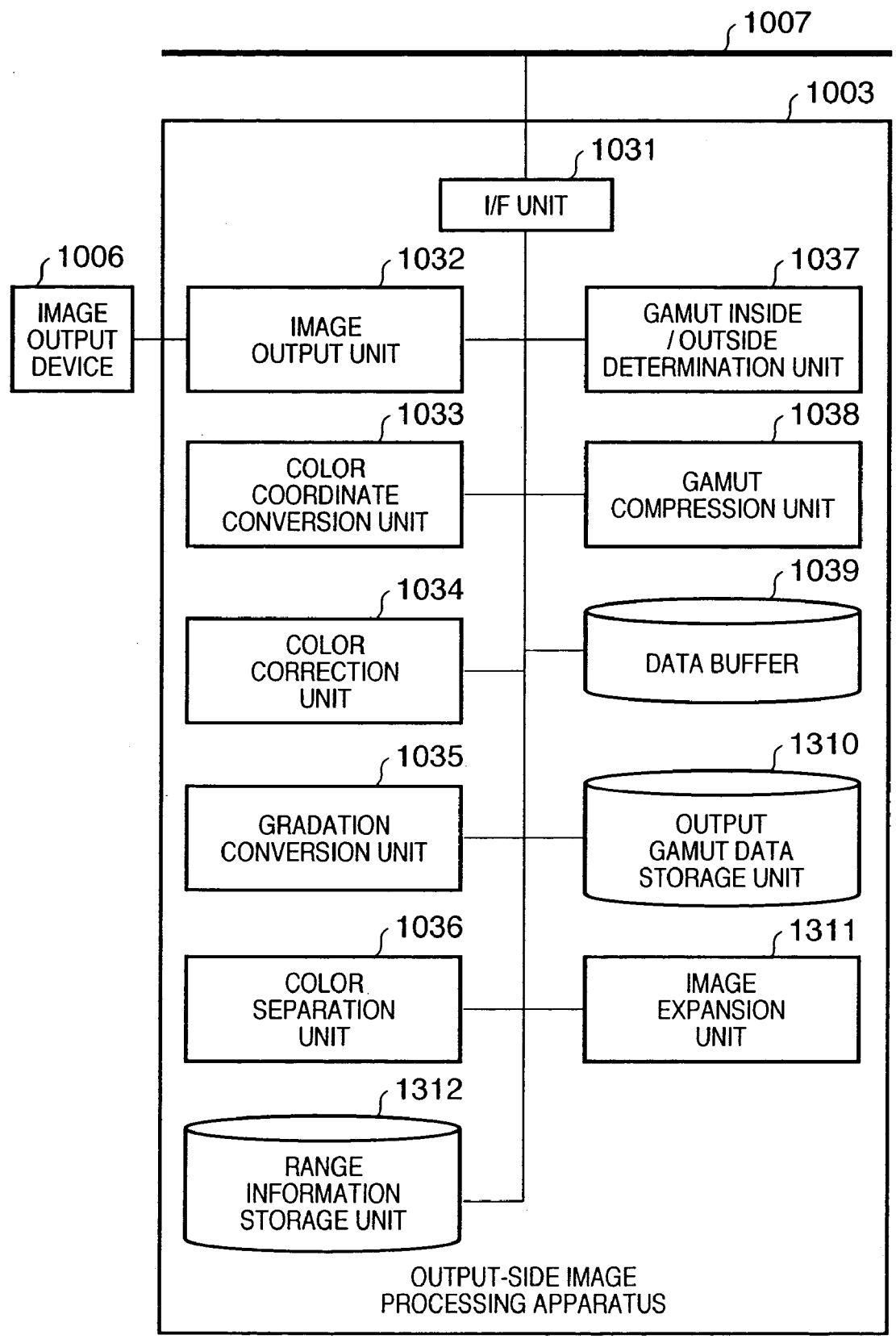

FIG. 16 is a flow chart showing the image process of the image processing apparatus 1. This image process is executed by the CPU of the image processing apparatus 1.

When image data is input from the image input device 2 via the image input unit 5, the image data is written in the data buffer 11 (S2201). The input image data undergoes color coordinate conversion into internal process RGB values via XYZ values by the color coordinate conversion unit 8 (S2202). In this embodiment, scRGB is used as color coordinate values of the input image data. Therefore, color coordinate conversion in step S2202 uses equations (1), (2), and (7). Note that the converted RGB value may undergo a gamma conversion process as needed.

As in the second embodiment, gamut information of an internal process color signal is read out from the internal process gamut storage unit 14 (S2203), and the gamut inside/outside determination unit 9 determines whether the image data which has undergone the color coordinate conversion falls inside or outside the internal process gamut (S2204). If the determination result indicates that the image data falls within the internal process gamut, the flow jumps to step S2207; otherwise, the flow advances to step S2206 (S2205).

If it is determined that the image data falls outside the internal process gamut, the color conversion unit 10 converts that image data into image data corresponding to a color of an inframarginal portion of the internal process gamut, and writes the converted data at a corresponding location on the data buffer 11 (S2206). It is then determined if image data to be processed corresponds to the last pixel of the input image data (S2207). If the image data to be processed does not correspond to the last pixel, the flow returns to step S2204.

If the image data corresponds to the last pixel, the image processing unit 15 applies image processes such as gradation correction, color correction, and the like to the image data stored in the data buffer 11 (S2208), and the gamut mapping unit 16 maps the internal process gamut to the gamut of the image output device 4 (S2209). Then, the gamut-mapped image data is output to the image output device 4 via the image output unit 7 (S2210), thus ending the process.

[Gamut Mapping]

FIG. 17 is a flow chart showing the process for mapping the internal process gamut to the gamut of the image output device in step S2209.

Internal process gamut information is read from the internal process gamut storage unit 14 (S2301). This gamut information includes the LCh values of 3D information of the internal process gamut, as has been explained using FIGS. 12A and 12B. The 3D information to be read out includes C values corresponding to maximum saturation levels in 10-step increments of L and h values. Although not shown in FIGS. 12A and 12B, the RGB values of an internal process color signal corresponding to these LCh values are also stored in the internal process gamut storage unit 14, and are read in step S2301.

The gamut information of the image output device 4 is read from the image output device gamut storage unit 17 (S2302). This gamut information includes L'C'h' values indicating the gamut of the image output device 4 as in the 3D information of the internal process gamut. The 3D information to be read out includes, for example, C' values corresponding to maximum saturation levels in 10-step increments of L' and h' values. Also, the R'G'B' values of an image output color signal corresponding to these L'C'h' values are stored in the image output device gamut storage unit 17, and are read out in step S2302.

The LCh values of the internal process gamut and the L'C'h' values of the gamut of the image output device 4 are obtained for each lightness L value and hue h value. The correspondence among the LCh values, L'C'h' values, RGB values, and R'G'B' values is determined to generate a 3D lookup table (3DLUT) (S2303).

Using the 3DLUT, the gamut of an image to be processed is converted from the internal process gamut to the gamut of the image output device 4 (S2304), thus ending the process.

In this manner, it is determined using black information and white information of the internal process gamut whether input color data falls inside or outside the internal process gamut, and the color data which falls outside the internal process gamut undergoes color conversion in accordance with the conversion method (and conversion condition) set by the user. Hence, a color that falls outside the internal process gamut can be converted into a color on the inframarginal portion of the internal process gamut and can be further converted into the gamut of the image output device 4 while preserving its tincture as much as possible.

Modification

In the above embodiments, the color conversion into the XYZ value uses conversion equations with Y which normalized to 0 to 1. However, the present invention is not limited to such specific equations, and Y may be normalized to 0 to 100.

In the above embodiments, the color conversion method displayed on the interface window of FIG. 7 has been explained. However, the present invention is not limited to such specific color conversion method, and any other color conversion methods of user's choice may be used. FIG. 8 shows the conversion direction of each color conversion method, but the present invention is not limited to such specific conversion direction. The color after color conversion is that on the inframarginal portion of the gamut. Alternatively, a color may be converted into a color inside the gamut. Furthermore, the color coordinate system used in color conversion is not limited to the LCh coordinate system, and any other color systems may be used. In the above embodiments, D65 is used as white, but the present invention is not limited to this.

In the above embodiments, the selection method using buttons has been exemplified as the user interface window shown in FIG. 7. However, the present invention is not limited to such specific selection method, and a user interface window with which the user selects using, e.g., a drop-down menu may be adopted. Also, a user interface window to which the user directly inputs keywords may be used. Furthermore, the user may select a color after color conversion on the color coordinate system. That is, the configuration of the user interface is not particularly limited as long as the user can make setups of his or her choice.

In the above embodiments, the LCh values are stored as gamut information. However, the present invention is not limited to such specific information, and any other formats that can express a 3D gamut may be used. Also, the gamut information may be stored in accordance with a given format such as an ICC profile or the like.

Fourth Embodiment

FIGS. 18A to 18D are block diagrams showing the arrangement of an image processing apparatus according to the fourth embodiment. Reference numeral 1001 denotes an input-side image processing apparatus of the fourth embodiment; 1002, a display-side image processing apparatus of the fourth embodiment; 1003, an output-side image processing apparatus of the fourth embodiment; 1004, an image input device such as a digital camera, color scanner, or the like, which is used to input an image; 1005, an image display device such as a CRT, LCD, or the like, which is used to display an image; and 1006, an image output device such as a color printer or the like, which is used to output an image.

The internal arrangement of the input-side image processing apparatus 1001 will be explained first. Reference numeral 1011 denotes an interface (I/F) unit which is used to exchange data between the input-side image processing apparatus 1001 and other apparatuses; 1012, an image input unit for inputting image data input by the image input device 1004; 1013, a color coordinate conversion unit for performing color conversion between an image input device color space and color conversion work space, and color conversion between the color conversion work space, and a color expression space; 1014, an image compression unit for compressing the input image to reduce the data size upon exchanging the image with other apparatuses; 1015, a color correction unit for performing color correction of the input image; 1016, a gradation conversion unit for performing gradation conversion of the input image; and 1017, a data buffer for temporarily holding image data for image data processes. Note that these apparatus 1001 to 1003 are connected by a communication line 1007 such as a system bus, a local area network (LAN), a serial bus which conforms to or based on IEEE 1394 standards or Universal Serial Bus (USB) standards, or the like.

Next, the internal arrangement of the display-side image processing apparatus 1002 will be explained. Reference numeral 1021 denotes an I/F unit for exchanging data between the display-side image processing apparatus 1002 and other apparatuses; 1022, an image display unit for displaying image data to be displayed on the image display device 1005; 1023, a color coordinate conversion unit for performing color conversion between an image display device color space and color conversion work space, and color conversion between the color conversion work space, and a color expression space; 1024, a color correction unit for performing color correction of the image; 1025, a gradation conversion unit for performing gradation conversion of the image; 1026, a gamut inside/outside determination unit for determining if a color falls inside/outside a gamut; 1027, a gamut compression unit for compressing the gamut; 1028, a data buffer for temporarily holding image data for image data processes; 1029, an image compression/expansion unit for compressing/expanding an image to reduce the data size upon exchanging the image with other apparatuses; 1210, a user interface (UI) unit for allowing the user to make image process operations using the display-side image processing apparatus 1002; and 1211, a range information storage unit for storing range information of the color conversion work space.

The internal arrangement of the output-side image processing apparatus 1003 will be explained below. Reference numeral 1031 denotes an I/F unit for exchanging data between the output-side image processing apparatus 1003 and other apparatuses; 1032, an image output unit for outputting image data to be output by the image output device 1006; 1033, a color coordinate conversion unit for performing color conversion between a color conversion work space and color expression space; 1034, a color correction unit for performing color correction of the image; 1035, a gradation conversion unit for performing gradation conversion of the image; 1036, a color separation unit; 1037, a gamut inside/outside determination unit for determining if a color falls inside/outside a gamut; 1038, a gamut compression unit for compressing the gamut; 1039, a data buffer for temporarily holding image data for image data processes; 1310, an output gamut data storage unit for storing gamut information of the image output device 1006; 1311, an image expansion unit for expanding an image input from another apparatus; and 1312, a range information storage unit for storing range information of the color conversion work space.

[Overall Processing]

Figure 19:
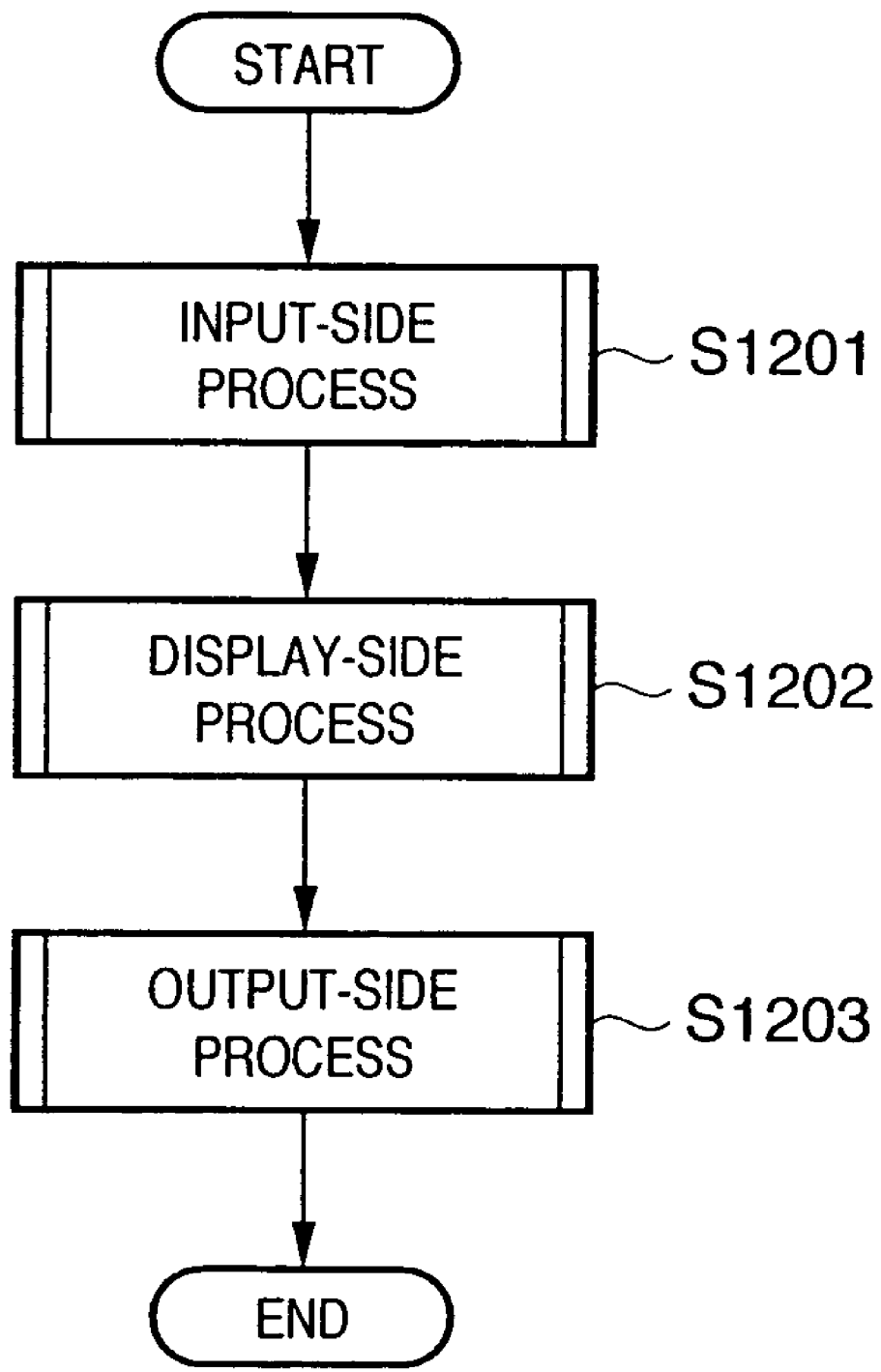
FIG. 19 is a flow chart for explaining the flow of processes in the image processing apparatus of the fourth embodiment.

FIG. 19 is a flow chart of image processes executed by the input-side image processing apparatus 1001, display-side image processing apparatus 1002, and output-side image processing apparatus 1003. The color conversion processes executed in the input-side image processing apparatus 1001, display-side image processing apparatus 1002, and output-side image processing apparatus 1003 will be described in detail below using the flow chart of FIG. 19. In step S1201, the input-side image processing apparatus 1001 executes image processes. In step S1202, the display-side image processing apparatus 1002 executes image processes. In step S1203, the output-side image processing apparatus 1003 executes image processes, thus ending the processes.

[Process in Input-Side Image Processing Apparatus]

Figure 20:
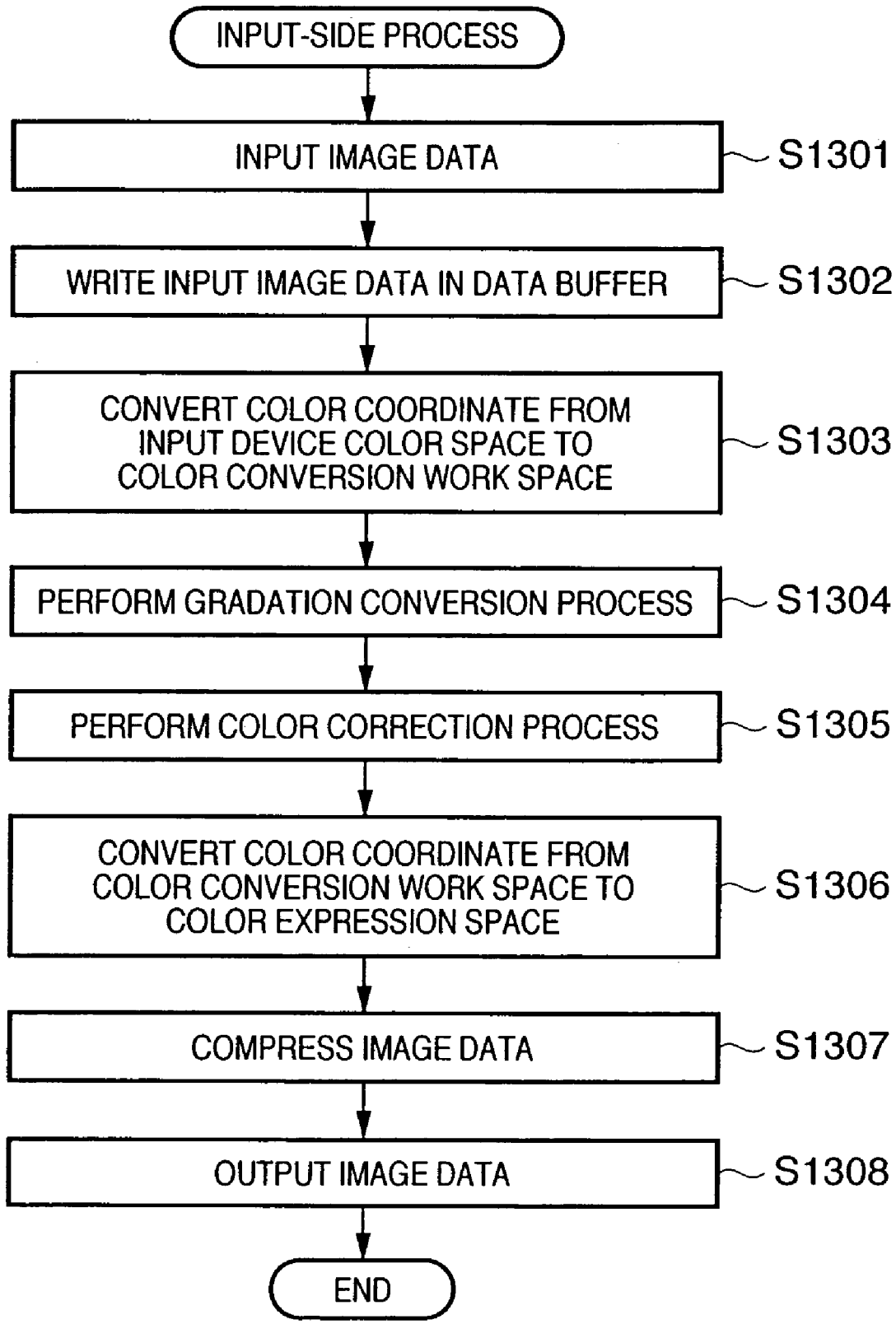
FIG. 20 is a flow chart for explaining the flow of processes in an input-side image processing apparatus of the fourth embodiment.

FIG. 20 is a flow chart for explaining the image processes executed in the input-side image processing apparatus 1001 in step S1201. A detailed explanation will be given below using the flow chart of FIG. 20.

In step S1301, the image input unit 1012 inputs an image using the image input device 1004. In step S1302, the input image data is written in the data buffer 1017. In step S1303, the color coordinate conversion unit 1013 performs color coordinate conversion from an input device color space RiGiBi (RGB values normalized to 0 to 1) into a color conversion work space R1G1B1 (RGB values normalized to 0 to 1) used to execute the color conversion process inside the input-side image processing apparatus 1001. This conversion uses:

$$\begin{bmatrix} R1 \\ G1 \\ B1 \end{bmatrix} = \begin{bmatrix} a11 & a12 & a13 \\ a21 & a22 & a23 \\ a31 & a32 & a33 \end{bmatrix} \begin{bmatrix} Ri \\ Gi \\ Bi \end{bmatrix} \quad (11)$$

Note that coefficients a11 to a33 in equation (11) are determined in advance.

The input device color space RiGiBi includes a color signal having color characteristics unique to the image input device 1004, and the color conversion work space R1G1B1 includes a color signal having a gamut that contains those of image input/output devices, and is defined by:

$$\begin{bmatrix} R1 \\ G1 \\ B1 \end{bmatrix} = \begin{bmatrix} b11 & b12 & b13 \\ b21 & b22 & b23 \\ b31 & b32 & b33 \end{bmatrix} \begin{bmatrix} X \\ Y \\ Z \end{bmatrix} \quad (12)$$

The color conversion work space may use R1'G1'B1' as values after gamma conversion of R1G1B1.

In step S1304, the gradation conversion unit 1016 executes gradation correction process for correcting gradation characteristics unique to the image input device 1004, and converting input image data into desired gradation characteristic data. In step S1305, the color correction unit 1015 executes color correction processes for correcting color characteristics unique to the image input device 1004, and converting input image data into desired color characteristic data. In step S1306, the color coordinate conversion unit 1013 performs a color coordinate conversion process from the color conversion work space R1G1B1 onto a color expression space scRGB used to exchange data with other apparatuses. Note that the color expression space scRGB can express a whole visual range. This conversion uses equations (13) to (15).

$$\begin{bmatrix} X \\ Y \\ Z \end{bmatrix} = \begin{bmatrix} c11 & c12 & c13 \\ c21 & c22 & c23 \\ c31 & c32 & c33 \end{bmatrix} \begin{bmatrix} R1 \\ G1 \\ B1 \end{bmatrix} \quad (13)$$

Note that equation (13) is an inverse conversion equation of equation (12).

$$\begin{bmatrix} R_{scRGB} \\ G_{scRGB} \\ B_{scRGB} \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \begin{bmatrix} X \\ Y \\ Z \end{bmatrix} \quad (14)$$

The color expression space scRGB (relative scene RGB color space) given by equation (14) adopts D65 as a white reference point. When the color conversion work space R1G1B1 has a white reference point other than D65, XYZ data undergo a white conversion process to D65 by:

$$R_{scRGB(16)} = R_{scRGB} \times 8192 + 4096$$
$$G_{scRGB(16)} = G_{scRGB} \times 8192 + 4096$$
$$B_{scRGB(16)} = B_{scRGB} \times 8192 + 4096 \quad (15)$$

before conversion of equation (14).

In step S1307, the image compression unit 1014 compresses the image data to reduce the transfer load upon exchanging the image with other apparatuses. In step S1308, the I/F unit 1011 outputs the image to other apparatuses, thus ending the process.

[Process in Display-Side Image Processing Apparatus]

Figure 21:
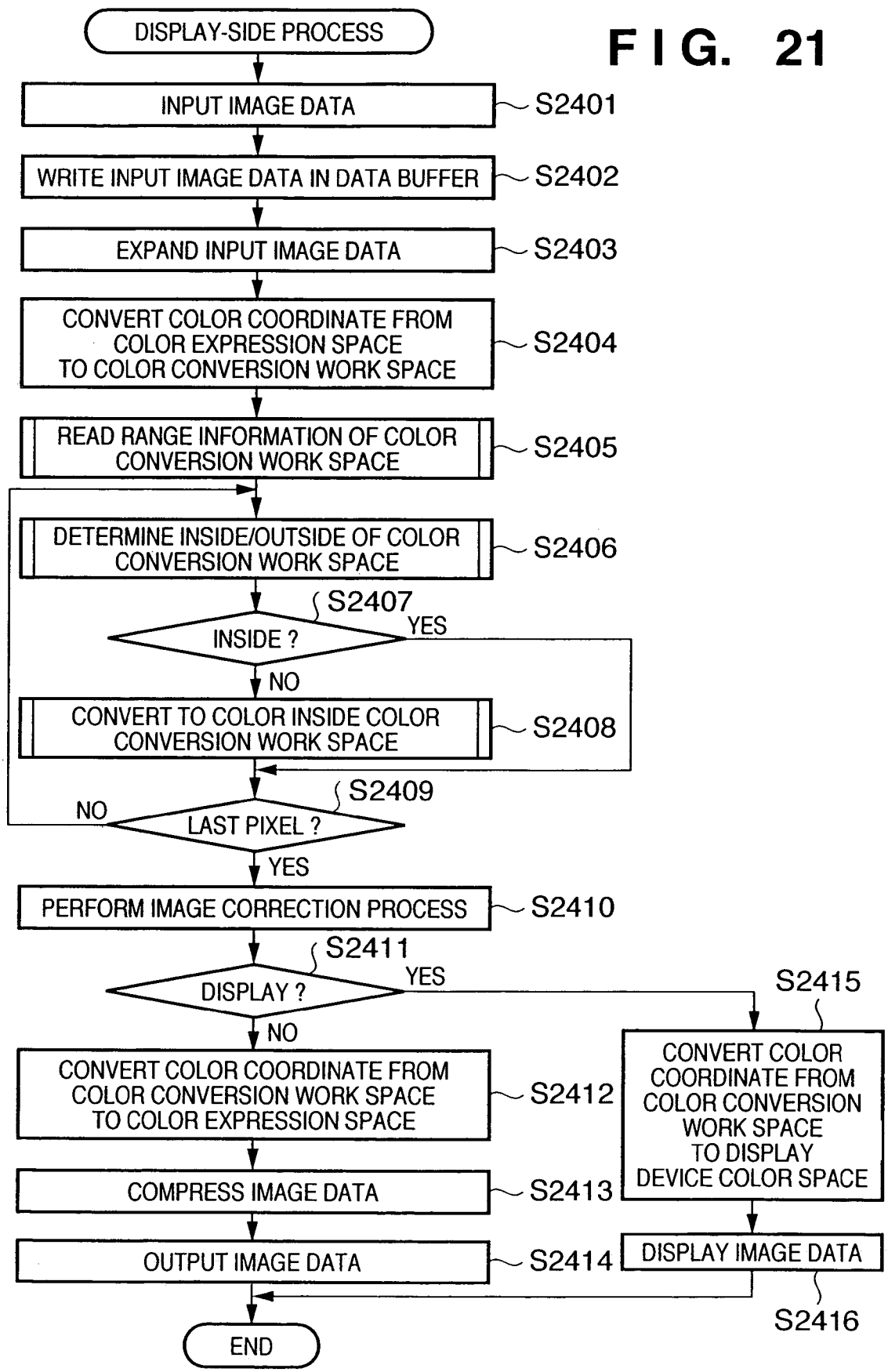
FIG. 21 is a flow chart for explaining the flow of processes in a display-side image processing apparatus of the fourth embodiment.

FIG. 21 is a flow chart for explaining the image processes executed in the display-side image processing apparatus 1002 in step S1202. A detailed explanation will be given below using the flow chart of FIG. 21.

In step S2401, the image input unit 1021 inputs an image. In step S2402, the input image data is written in the data buffer 1028. In step S2403, the image compression/expansion unit 1029 expands the input compressed image data. In step S2404, the color coordinate conversion unit 1023 performs color coordinate conversion from the color expression space scRGB into a color conversion work space R1G1B1 (RGB values normalized to 0 to 1) used to execute the color conversion process in the display-side image processing apparatus 1002. This conversion uses equation (12) and:

$$R_{scRGB} = R_{scRGB(16)} / 8192 + 0.5$$
$$G_{scRGB} = G_{scRGB(16)} / 8192 + 0.5$$
$$B_{scRGB} = B_{scRGB(16)} / 8192 + 0.5 \quad (16)$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{scRGB} \\ G_{scRGB} \\ B_{scRGB} \end{bmatrix} \quad (17)$$

Note that the color conversion work space may use R1'G1'B1' as values after gamma conversion of R1G1B1. In step S2405, range information of the color conversion work space is read out from the range information storage unit 1211. The gamut inside/outside determination unit 1026 determines in step S2406 whether the color signal that has undergone color coordinate conversion in step S2404 falls inside or outside the color conversion work space range. It is checked in step S2407 whether or not the determination result in step S2406 indicates inside the range. If the determination result indicates inside the range, the flow jumps to step S2409; otherwise, the flow advances to step S2408.

In step S2408, the gamut compression unit 1011 compresses the color signal, which is determined in step S2406 to fall outside the color conversion work space range, to the inframarginal portion of the color conversion work space range. It is then determined in step S2409 if a pixel to be processed is the last pixel of the input image data. If the pixel to be processed is not the last pixel, the flow returns to step S2406; otherwise, the flow advances to step S2410. In step S2410, the gradation conversion unit 1025 and color correction unit 1024 respectively execute the gradation conversion process and color correction process for converting image data into desired gradation characteristic data and desired color characteristic data. It is checked in step S2411 if the processed image data is to be displayed on the image display device 1005. If the image data is to be displayed, the flow advances to step S2415; otherwise, the flow advances to step S2412.

In step S2412, the color coordinate conversion unit 1023 executes the color coordinate conversion process from the color conversion work space R1G1B1 into the color expression space scRGB used to exchange data with other apparatuses. This conversion uses equations (13) to (15). As described above, the color expression space scRGB given by equation (14) adopts D65 as a white reference point. When the color conversion work space R1G1B1 has a white reference point other than D65, XYZ data undergo a white conversion process to D65 before conversion of equation (14). In step S2413, the image compression/expansion unit 1029 compresses image data to reduce the transfer load upon exchanging the image with other apparatuses. In step S2414, the I/F unit 1021 outputs the image to other apparatuses, thus ending this process. In step S2415, the color coordinate conversion unit 1023 executes the color coordinate conversion process from the color conversion work space R1G1B1 into an image display device color space RdGdBd. This conversion uses:

$$\begin{bmatrix} Rd \\ Gd \\ Bd \end{bmatrix} = \begin{bmatrix} d11 & d12 & d13 \\ d21 & d22 & d23 \\ d31 & d32 & d33 \end{bmatrix} \begin{bmatrix} R1 \\ G1 \\ B1 \end{bmatrix} \quad (18)$$

In step S2416, the image display unit 1022 displays the image using the image display device 1005, thus ending this process.

[Process in Output-Side Image Processing Apparatus]

Figure 22:
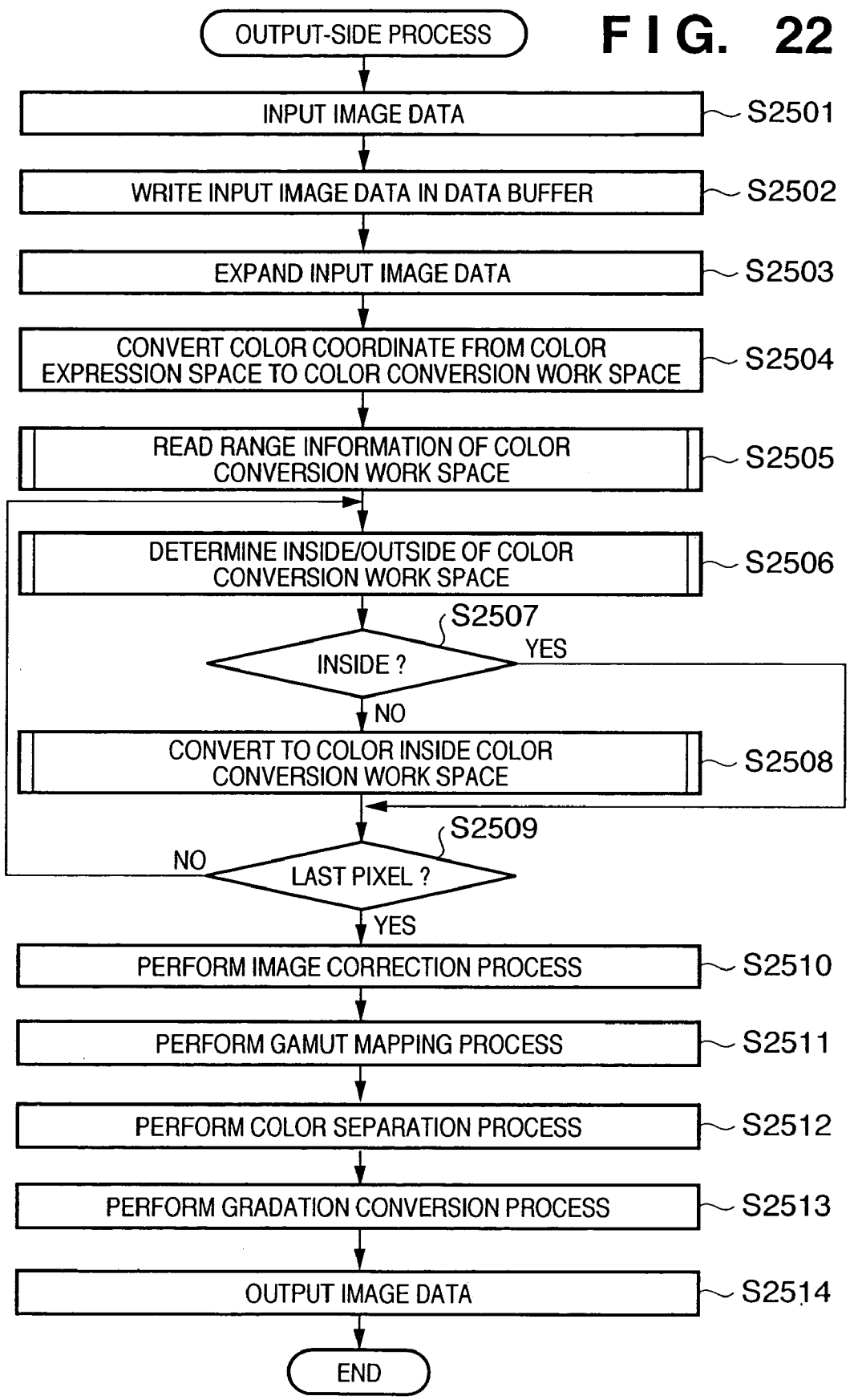
FIG. 22 is a flow chart for explaining the flow of processes in an output-side image processing apparatus of the fourth embodiment.

FIG. 22 is a flow chart for explaining the image processes executed in the output-side image processing apparatus 1003 in step S1203. A detailed explanation will be given below using the flow chart of FIG. 22.

In step S2501, the I/F unit 1031 inputs an image. In step S2502, the input image data is written in the data buffer 1039. In step S2503, the image expansion unit 1311 expands the input compressed image data. In step S2504, the color coordinate conversion unit 1033 performs color coordinate conversion from the color expression space scRGB into a color conversion work space R1G1B1 (RGB values normalized to 0 to 1) used to execute the color conversion process in the output-side image processing apparatus 1003. This conversion uses equations (16) to (17), and equation (12). Note that the color conversion work space may use R1'G1'B1' as values after gamma conversion of R1G1B1.

In step S2505, range information of the color conversion work space is read out from the range information storage unit 1312. The gamut inside/outside determination unit 1037 determines in step S2506 whether the color signal that has undergone color coordinate conversion in step S2504 falls inside or outside the color conversion work space range. It is checked in step S2507 whether or not the determination result in step S2506 indicates inside the range. If the determination result indicates inside the range, the flow jumps to step S2509; otherwise, the flow advances to step S2508. In step S2508, the gamut compression unit 1038 compresses the color signal, which is determined in step S2506 to fall outside the color conversion work space range, to the inframarginal portion of the color conversion work space range. It is then determined in step S2509 if a pixel to be processed is the last pixel of the input image data. If the pixel to be processed is not the last pixel, the flow returns to step S2506; otherwise, the flow advances to step S2510.

In step S2510, the gradation conversion unit 1035 and color correction unit 1034 respectively execute the gradation conversion process and color correction process for converting image data into desired gradation characteristic data and desired color characteristic data. In step S2511, the color conversion work space R1G1B1 undergoes gamut compression to an output device color space RoGoBo. The gamut compression uses a conversion table stored in the output gamut data storage unit 1310. This conversion table is, e.g., a 3D LUT. In step S2512, the color separation unit 1036 separates the output device color space RoGoBo into color signals unique to the output device. In step S2513, the gradation conversion unit 1035 executes a gradation conversion process such as halftoning or the like. In step S2514, the image output unit 1032 outputs the image using the image output device 1006, thus ending this process.

[Read Range Information of Color Conversion Work Space]

Figure 23:
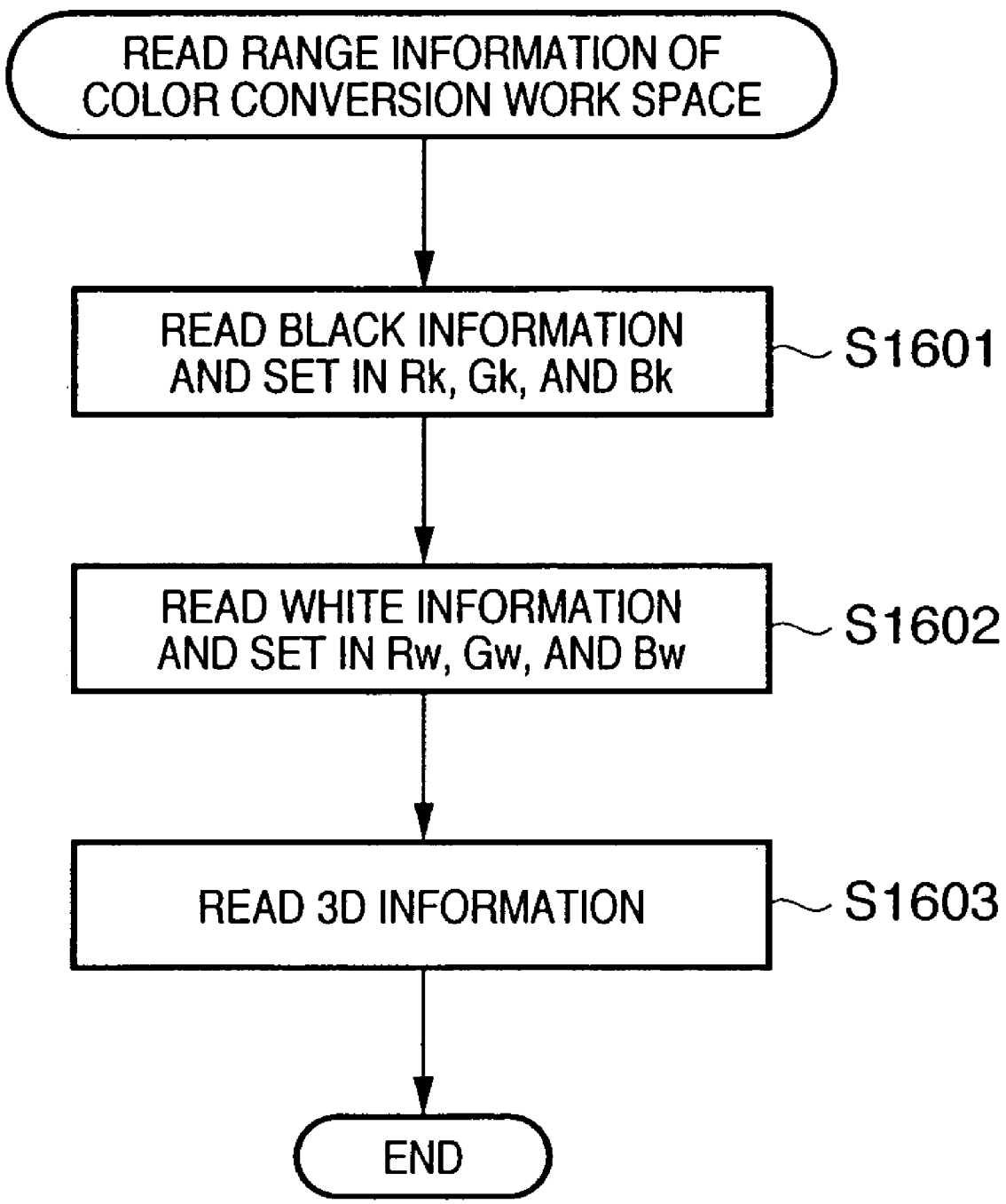
FIG. 23 is a flow chart for explaining a range information read process of a color conversion work space.

FIG. 23 is a flow chart of the process for reading out the range information of the color conversion work space from the range information storage units 1211 and 1312 in steps S2405 and S2505. A detailed explanation will be given using the flow chart of FIG. 23.

In step S1601, the RGB values of black as the lower limit values of the color conversion work space are read from the range information storage unit 1211 (1312) and are set in Rk, Gk, and Bk. In step S1602, the RGB values of white as the upper limit values of the color conversion work space are read from the range information storage unit 1211 (1312) and are set in Rw, Gw, and Bw. In step S1603, 3D information (LCh values) of the color conversion work space are read, thus ending the process.

FIGS. 27A and 27B show the RGB values of black information and white information of the color conversion work space and the LCh values of 3D information of the color conversion work space as an example of the color conversion work space information stored in the range information storage units 1211 and 1312. For example, black information is expressed by R=0.0, B=0.0, and B=0.0, and white information is expressed by R=1.0, G=1.0, and B=1.0. As the 3D information, after XYZ values obtained by equation (13) using the RGB values ranging from (0.0, 0.0, 0.0) to (1.0, 1.0, 1.0) are multiplied by 100, equations (19.1) to (19.4) (using D65 as white) and equation (20) are used to calculate LCh values based on those XYZ values and, for example, C values corresponding to maximum saturation levels in 10-step increments of L and h values are stored. As the 3D information, for example, C values corresponding to maximum saturation levels in 10-step increments of L and h values are stored.

if $Y/Yn > 0.008856$, $$L^* = 116(Y/Yn)^{1/3} - 16 \quad (19.1)$$

if $Y/Yn \leq 0.008856$, $$L^* = 903.29(Y/Yn) \quad (19.2)$$

where Y: the Y value of a tristimulus value on the XYZ color system

Yn: the Y value based on standard light of a perfect reflecting diffuser $$a^* = 500[f(X/Xn) - f(Y/Yn)]$$

$$b^* = 200[f(X/Xn) - f(Z/Zn)] \quad (19.3)$$

for if $X/Xn>0.008856$, $f(X/Xn)=(X/Xn)^{1/3}$ if $X/Xn \leq 0.008856$, $f(X/Xn)=7.78(X/Xn)+16/116$ if $Y/Yn>0.008856$, $f(Y/Yn)=(Y/Yn)^{1/3}$ if $Y/Yn \leq 0.008856$, $f(Y/Yn)=7.78(Y/Yn)+16/116$ If $Z/Zn>0.008856$, $f(Z/Zn)=(Z/Zn)^{1/3}$ if $Z/Zn \leq 0.008856$, $f(Z/Zn)=7.78(Z/Zn)+16/116$ (19.4)

Note that Xn=95.05, Yn=100.0, and Zn=108.91 since D65 is used as white. Next, the Lab values are converted into LCh values using:

$C'_{ab}=\sqrt{(a^{*2}+b^{*2})}$ $h_{ab}=\tan^{-1}(b^*/a^*)$ (20)

[Inside/Outside Determination Process of Color Conversion Work Space Range]

Figure 24:
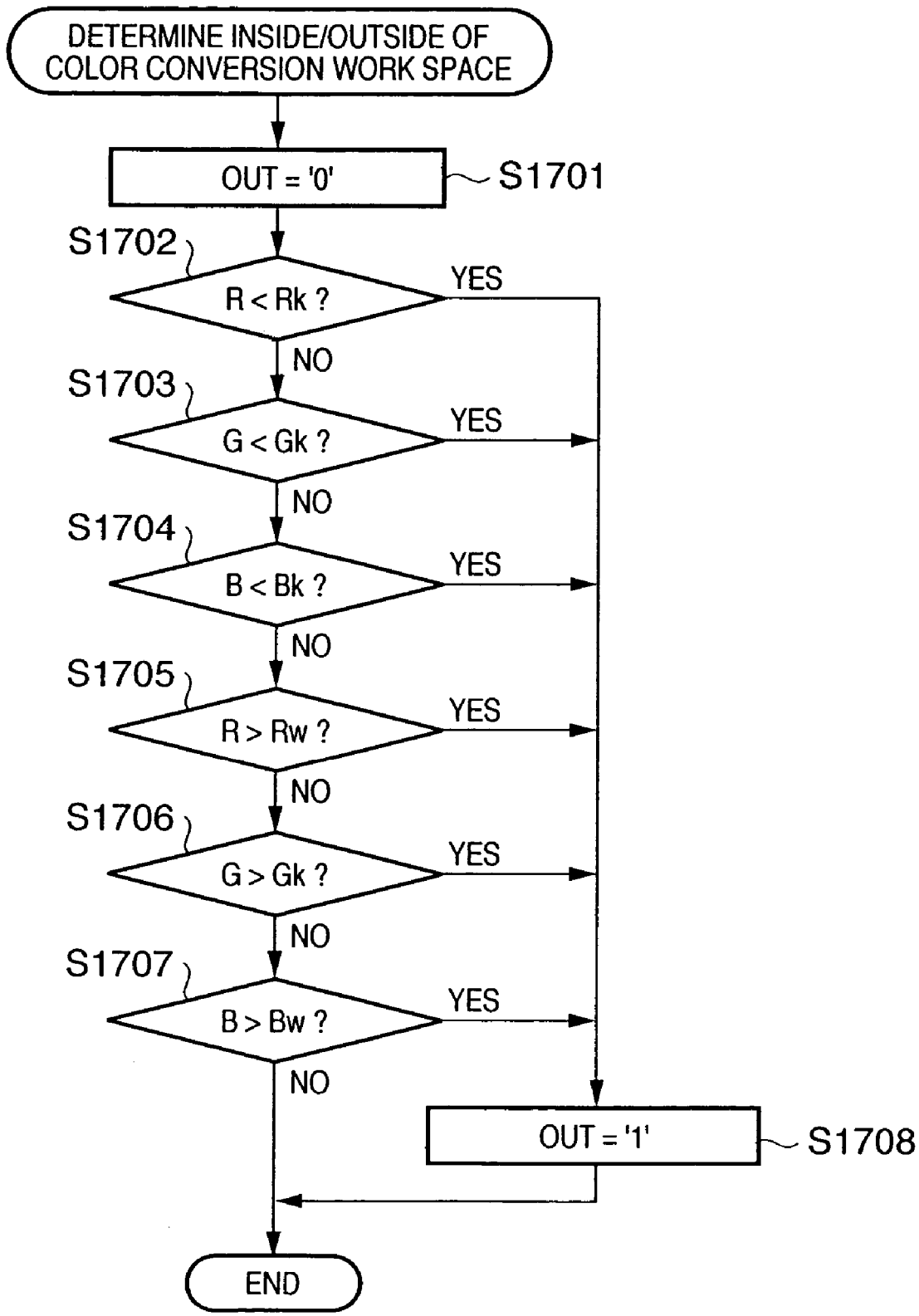
FIG. 24 is a flow chart for explaining a process for determining whether a color falls inside or outside the color conversion work space range.

FIG. 24 is a flow chart showing the process executed in the gamut inside/outside determination units 1026 and 1037 to determine in steps S2406 and S2506 whether a color signal falls inside or outside the color conversion work space range. A detailed explanation will be given using the flow chart of FIG. 24.

A gamut inside/outside determination flag OUT is initialized in step S1701. It is checked in step S1702 if the R value of a pixel to be processed is smaller than the lower limit value Rk of the color conversion work space. If R<Rk, the flow advances to step S1708; otherwise, the flow advances to step S1703. It is checked in step S1703 if the G value of the pixel to be processed is smaller than the lower limit value Gk of the color conversion work space. If G<Gk, the flow advances to step S1708; otherwise, the flow advances to step S1704. It is checked in step S1704 if the B value of the pixel to be processed is smaller than the lower limit value Bk of the color conversion work space. If B<Bk, the flow advances to step S1708; otherwise, the flow advances to step S1705. It is checked in step S1705 if the R value of the pixel to be processed is larger than the upper limit value Rw of the color conversion work space. If R>Rw, the flow advances to step S1708; otherwise, the flow advances to step S1706. It is checked in step S1706 if the G value of the pixel to be processed is larger than the upper limit value Gw of the color conversion work space. If G>Gw, the flow advances to step S1708; otherwise, the flow advances to step S1707. It is checked in step S1707 if the B value of the pixel to be processed is larger than the upper limit value Bw of the color conversion work space. If B>Bw, the flow advances to step S1708; otherwise, the process ends. In step S1708, '1' indicating outside the gamut is set in the gamut inside/outside determination flag OUT, thus ending the process.

[Color Conversion into Color Conversion Work Space]

Figure 25:
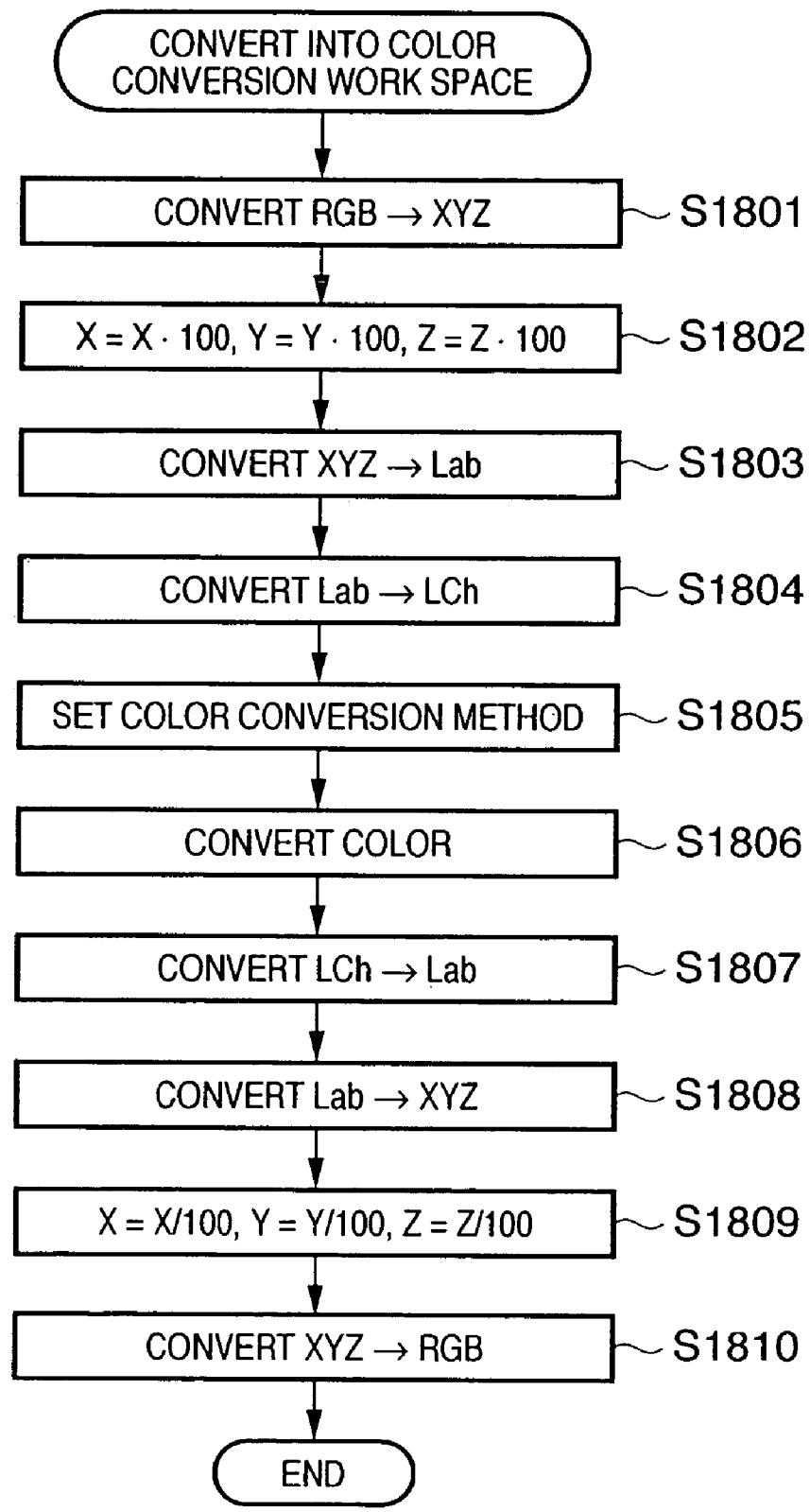
FIG. 25 is a flow chart for explaining a color conversion process into the color conversion work space.

FIG. 25 is a flow chart of the gamut compression executed by the gamut compression units 1027 and 1038 to convert a color signal which is determined to fall outside the color conversion work space to the inframarginal portion of the color conversion work space in steps S2408 and S2508. A detailed explanation will be given using the flow chart of FIG. 25.

In step S1801, the R1G1B1 values of the color conversion work space color signal are converted into XYZ values using equation (13). In step S1802, the XYZ values are respectively multiplied by 100 to adjust the scale (since the calculation results of the above equations are scaled so that Y falls within the range from 0 to 1). In step S1803, the XYZ values are converted into Lab values using equations (19.1) to (19.4). The conversion in step S1803 uses Rn=95.05, Gn=100.0, and Bn=108.91 since D65 is used as white. In step S1804, the Lab values are converted into LCh values using equation (20).

In step S1805, the user interface shown in FIG. 7 is presented to set a color conversion method. On a color conversion method setup window 601, a basic color conversion method is set using a basic setup window 602 used to select. When the user wants to set the color conversion method in more detail (to set a preferential conversion method in addition to the basic setup), he or she checks a detailed setup check box 603 and makes detailed setups on a detailed setup window 604. Note that "hue preservation conversion" is set as basic color conversion, and "gradation preference" is set as another preferential setup in FIG. 7. Upon completion of the setups, the user presses an OK button 605. If the user wants to cancel the setups, he or she presses a cancel button 606.

Figure 26:
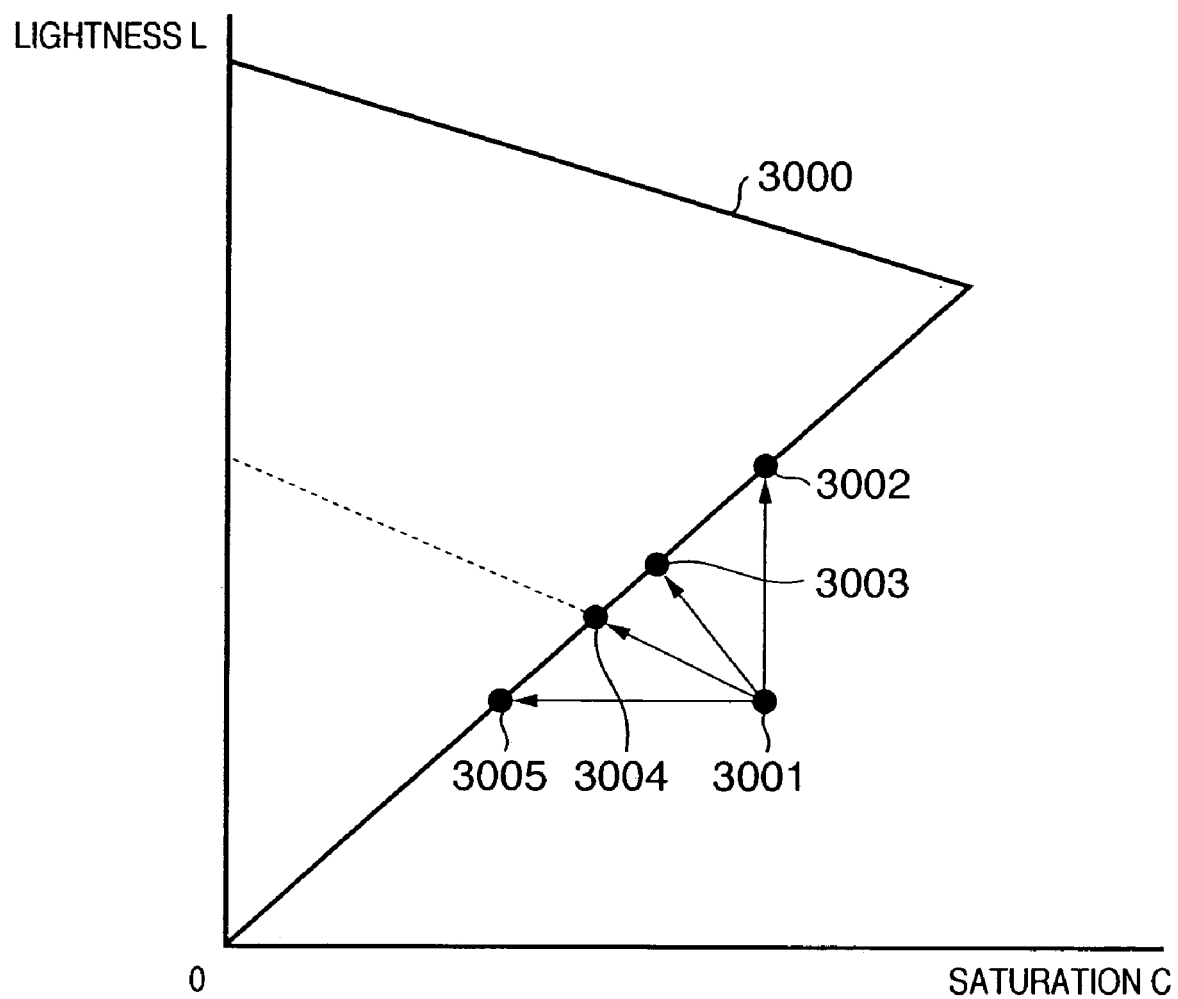
FIG. 26 is a view for explaining the color conversion process.

In step S1806, color conversion is performed in accordance with the color conversion method set in step S1805. FIG. 26 shows the color conversion process executed in step S1806, and shows a color conversion direction when "hue preservation" is selected as the basic color conversion method. Note that the ordinate plots lightness L, and the abscissa plots saturation C and also a color conversion work space 3000 read in steps S2405 and S2505. When "saturation preference" is selected on the detailed setup window 604, an input color 3001 is converted into a color on an inframarginal portion 3002 of the color conversion work space so as not to change saturation. When "color difference preference" is selected, the input color 3001 is converted into a color on an inframarginal portion 3003 of the color conversion work space so as to minimize the color difference. When "gradation preference" is selected, the input color 3001 is converted into a color on an inframarginal portion 3004 of the color conversion work space so as not to change gradation. When "lightness preference" is selected, the input color 3001 is converted into a color on an inframarginal portion 3005 of the color conversion work space so as not to change lightness.

In step S1807, the LCh values are converted into Lab values using the inverse conversion equation of equation (20). In step S1808, the Lab values are converted into XYZ values using the inverse conversion equations of equations (19.1) to (19.4). In step S1809, the XYZ values are divided by 100 to set the original scale. In step S1810, the XYZ values are converted into R1G1B1 values of the color conversion work space signal, thus ending the process.

As described above, according to the fourth embodiment, upon exchanging image data among color image input/output devices or in image processes such as color conversion and the like, the color expression space that can express the whole visual range is used to exchange image data between the devices, and the color conversion work space that includes the gamut of the device is independently used in the color conversion process inside the device. Hence, the image input device, image display device, and image output device can exchange data of the visual range, and can execute color conversion suited to each individual device.

Fifth Embodiment

Figure 28:
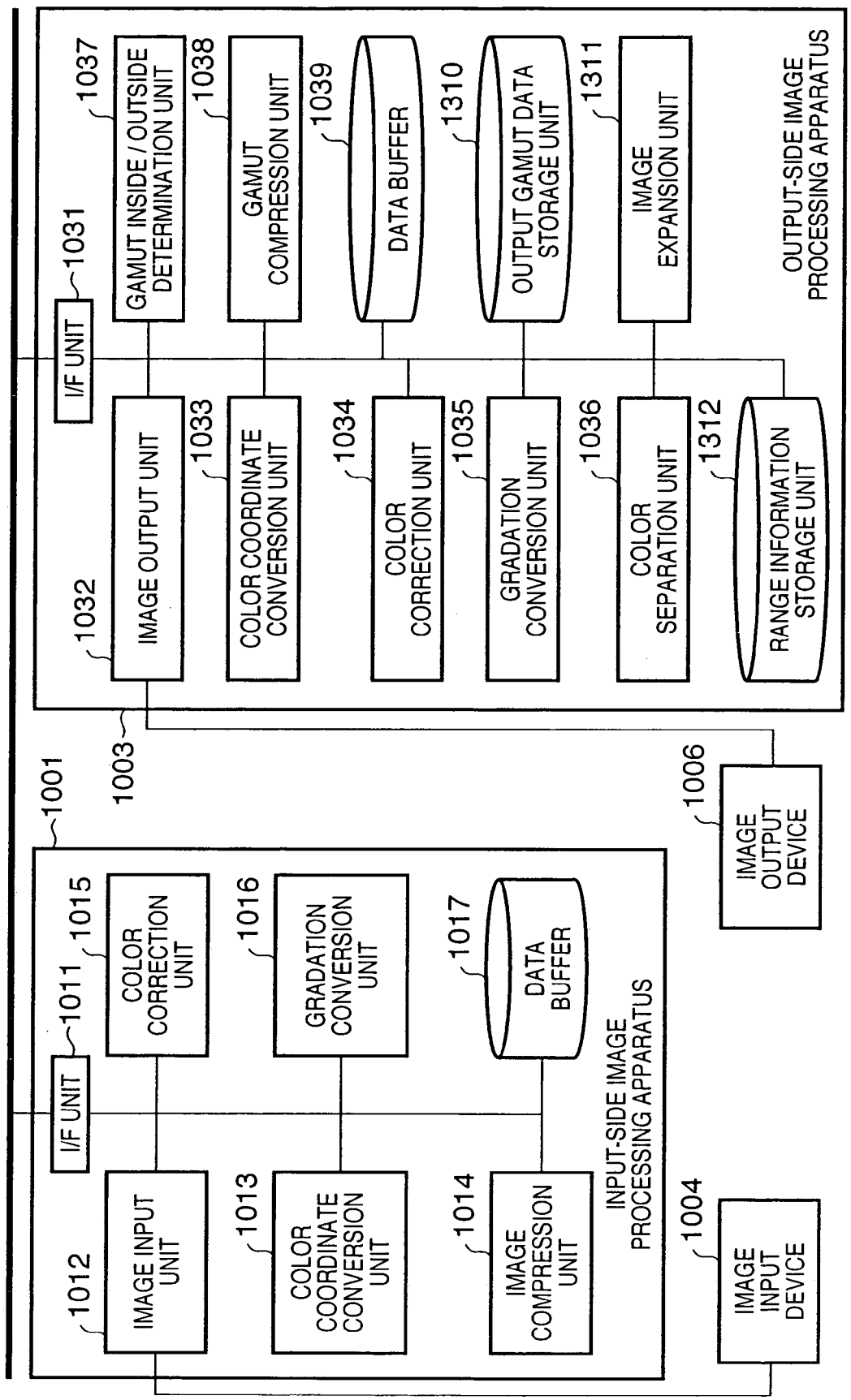
FIG. 28 is a block diagram of an image processing apparatus according to the fifth embodiment.

FIG. 28 is a block diagram showing the arrangement of the input-side image processing apparatus 1001 and the output-side image processing apparatus 1003 according to the fifth embodiment. Since the names and functions of the respective units are the same as those in the fourth embodiment, a description thereof will be omitted. The difference from the fourth embodiment is that this embodiment comprises only the input-side image processing apparatus 1001 and output-side image processing apparatus 1003.

[Overall Processing]

Figure 29:
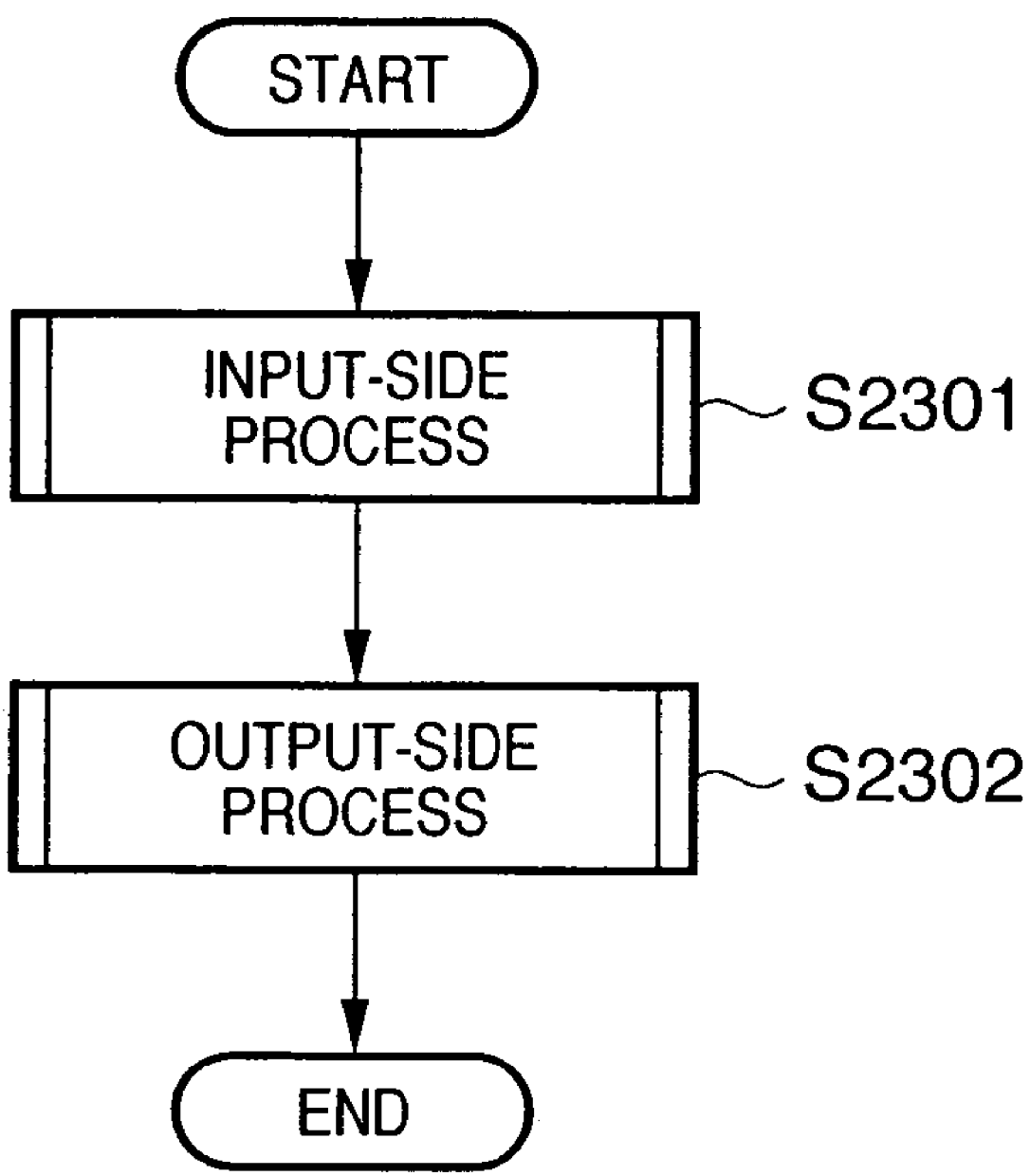
FIG. 29 is a flow chart for explaining the flow of processes in the image processing apparatus of the fifth embodiment.
Figure 30A:
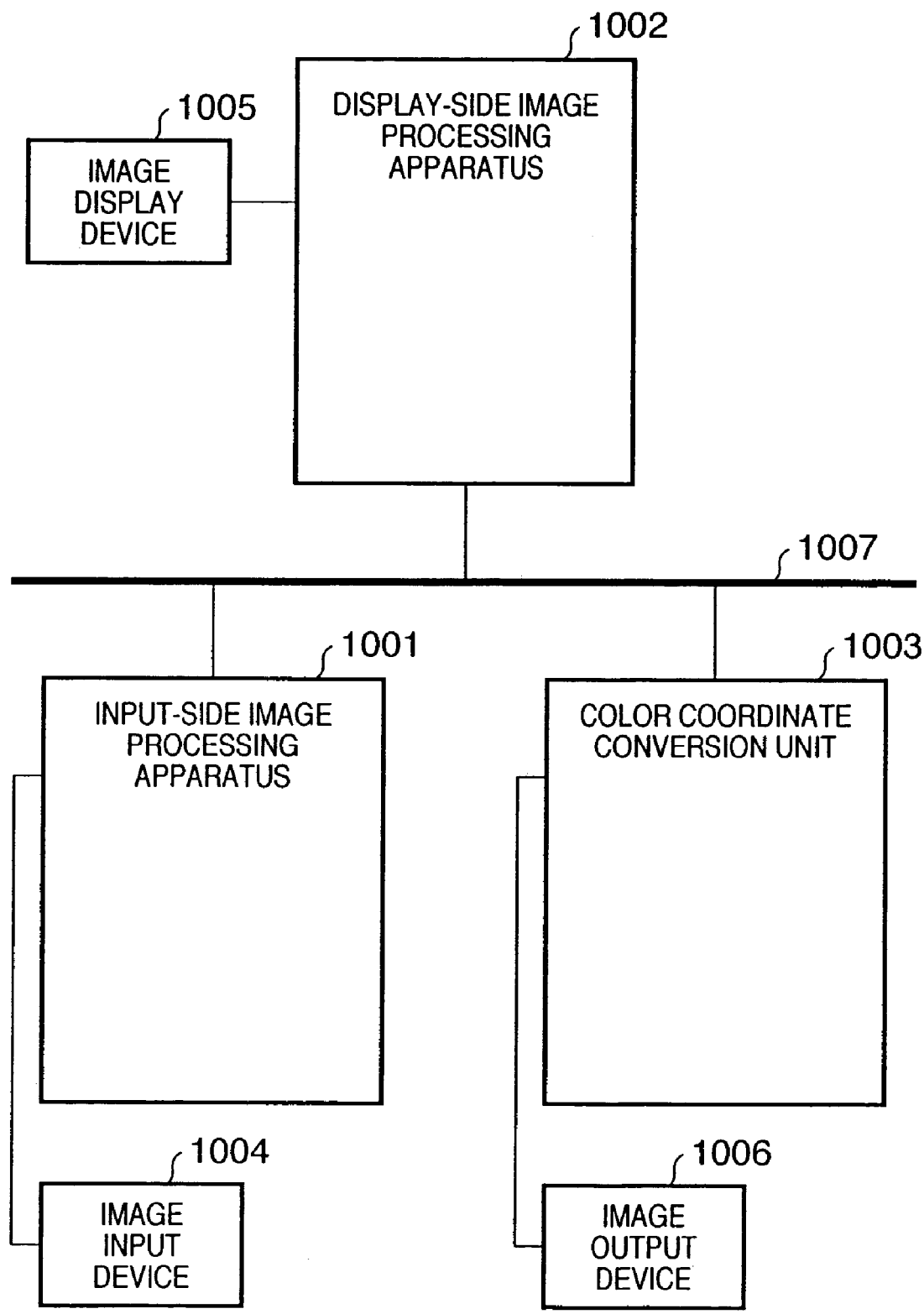
FIGS. 30A to 30D are block diagrams of an image processing apparatus according to the sixth embodiment.
Figure 30B:
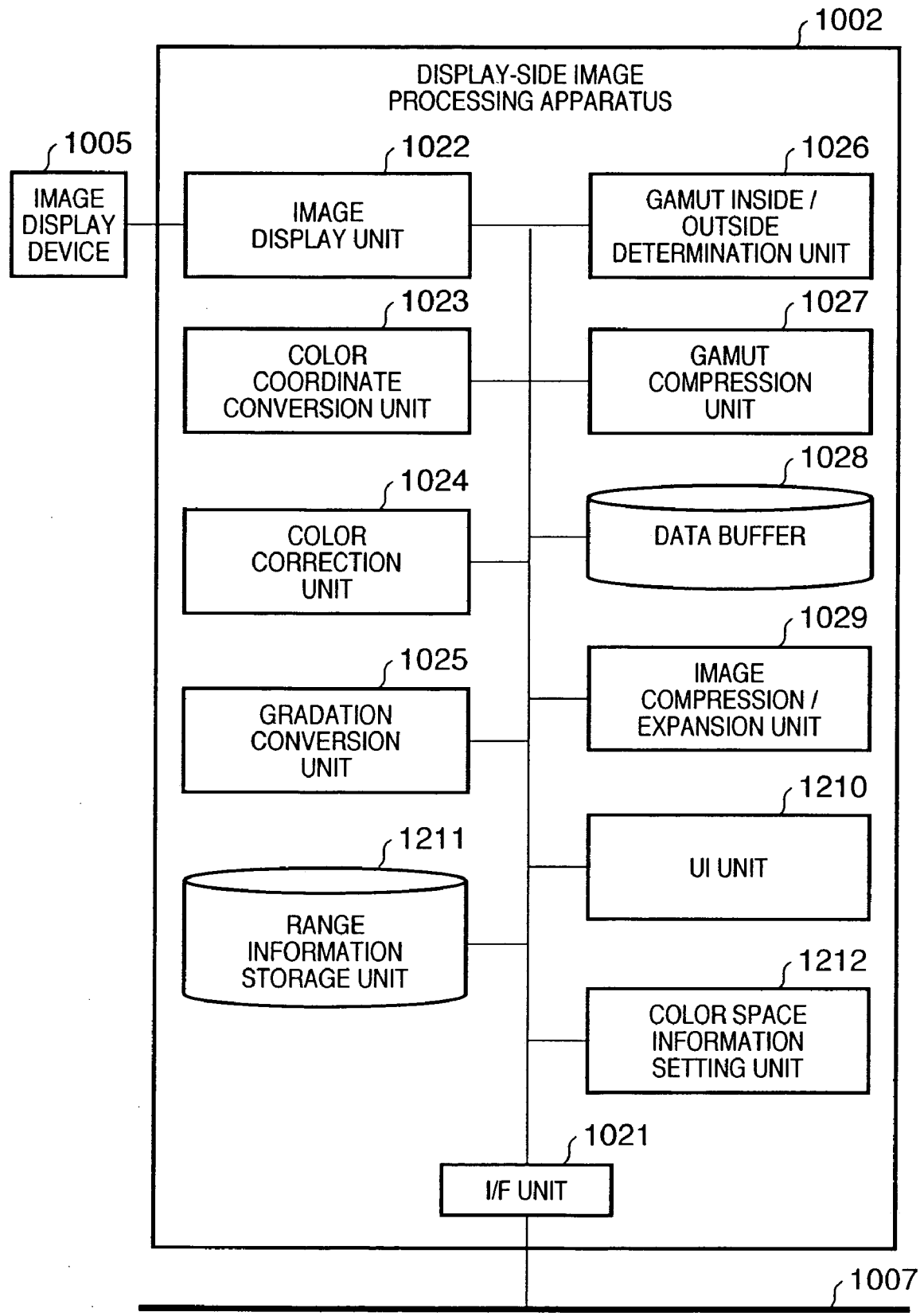
Figure 30C:
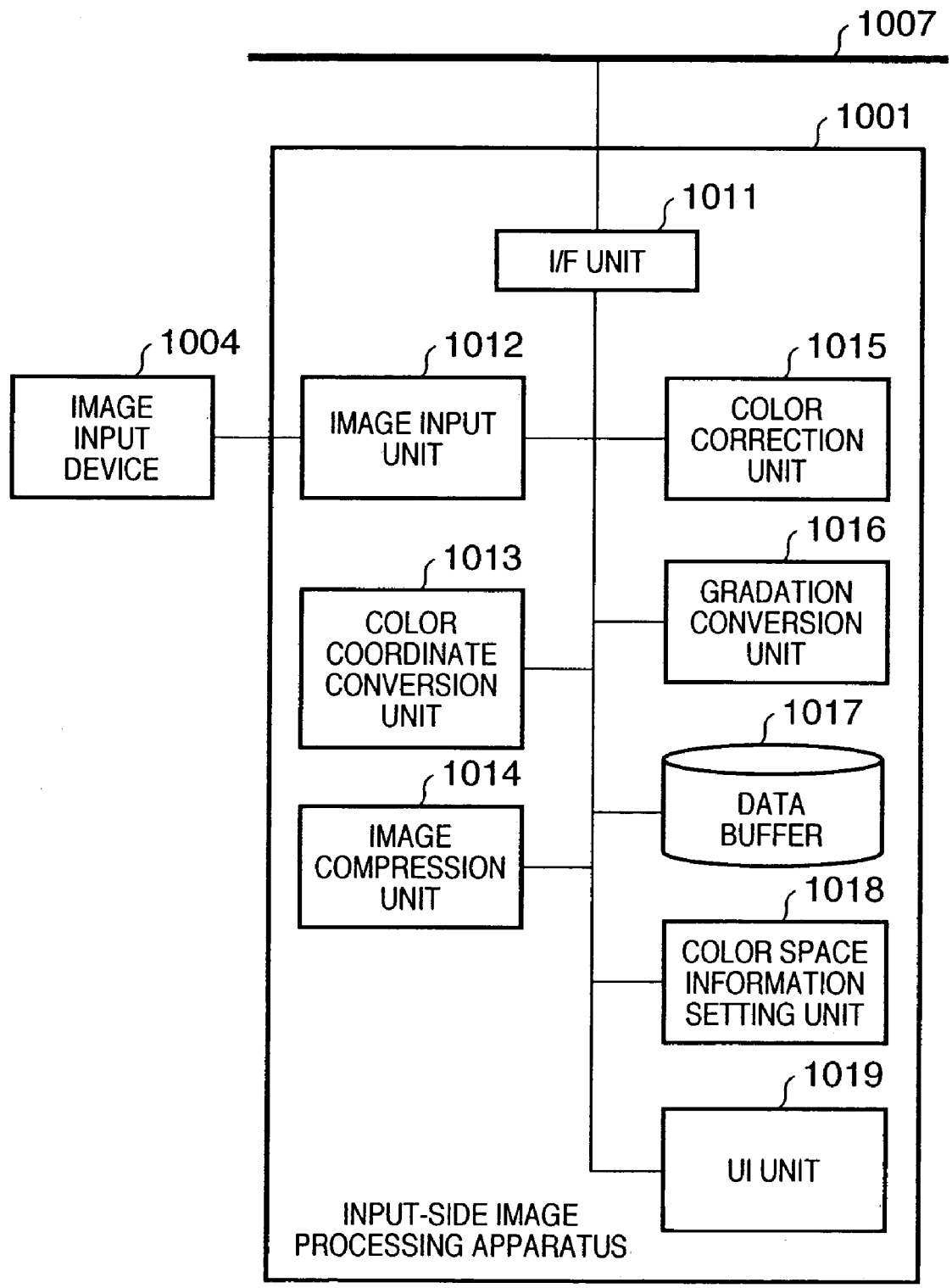
Figure 30D:
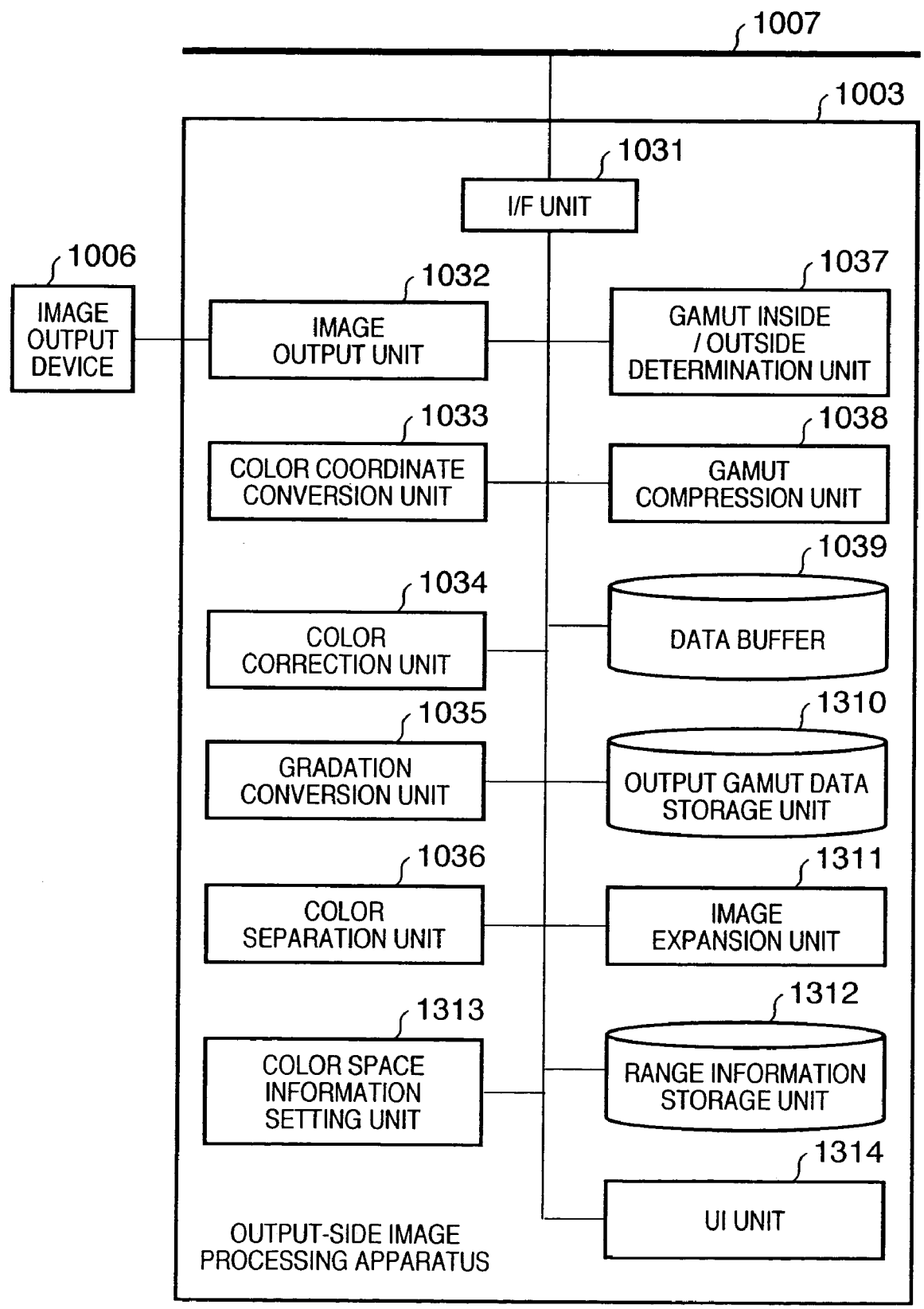

FIG. 29 is a flow chart of image processes executed by the input-side image processing apparatus 1001 and output-side image processing apparatus 1003. The color conversion processes executed in the input-side image processing apparatus 1001 and output-side image processing apparatus 1003 will be described in detail below using the flow chart of FIG. 29. In step S2301, the input-side image processing apparatus 1001 executes image processes. In step S2302, the output-side image processing apparatus 1003 executes image processes, thus ending the processes. Note that the processing contents in step S2301 are the same as those in step S1201, and the processing contents in step S2302 are the same as those in step S1203.

As described above, according to the fifth embodiment, upon exchanging image data between color image input/output devices or in image processes such as color conversion and the like, the color expression space that can express the whole visual range is used to exchange image data between the devices, and the color conversion work space that includes the gamut of the device is independently used in the color conversion process inside the device. Hence, the image input device and image output device can exchange data of the visual range, and can execute color conversion suited to each individual device.

Sixth Embodiment

FIGS. 30A to 30D are block diagrams showing the arrangement of the input-side image processing apparatus 1001, display-side image processing apparatus 1002, and output-side image processing apparatus 1003. A description of units which have the same names and functions as those in the fourth embodiment will be omitted.

The internal arrangement of the input-side image processing apparatus 1001 will be described first. Reference numeral 1018 denotes a color space information setting unit for setting a color conversion work space used inside the input-side image processing apparatus 1001; and 1019, a UI unit for allowing the user to set color space information.

The internal arrangement of the display-side image processing apparatus 1002 will be described below. Reference numeral 1210 denotes a UI unit for allowing the user to set color space information; and 1212, a color space information setting unit for setting a color conversion work space used inside the display-side image processing apparatus 1002.

The internal arrangement of the output-side image processing apparatus 1003 will be described below. Reference numeral 1313 denotes a color space information setting unit for setting a color conversion work space used inside the output-side image processing apparatus 1003; and 1314, a UI unit for allowing the user to set color space information.

[Overall Processing]

Figure 31:
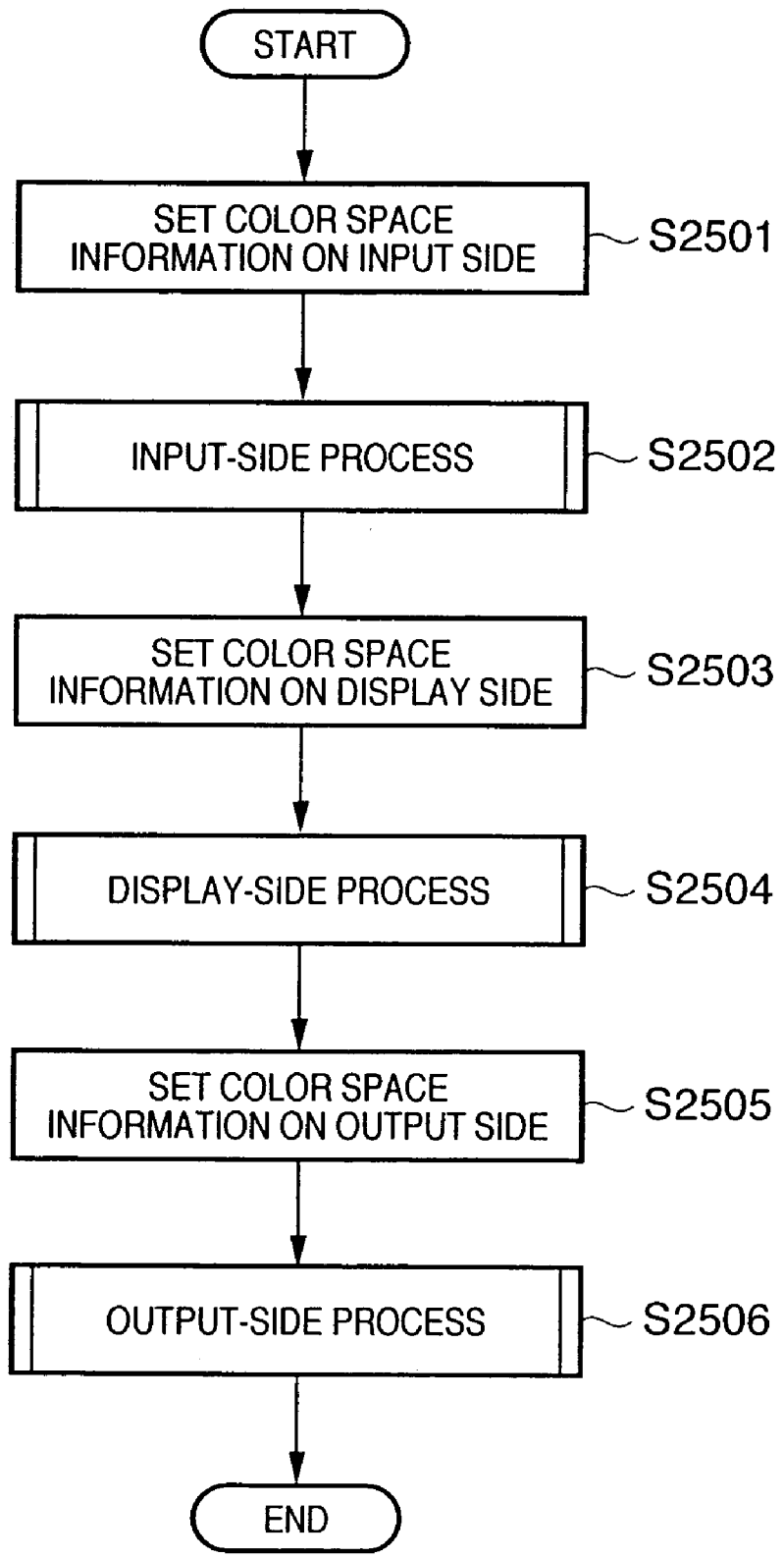
FIG. 31 is a flow chart for explaining the flow of processes in the image processing apparatus of the sixth embodiment.

FIG. 31 is a flow chart of image processes executed by the input-side image processing apparatus 1001, display-side image processing apparatus 1002, and output-side image processing apparatus 1003. The color conversion processes executed in the input-side image processing apparatus 1001, display-side image processing apparatus 1002, and output-side image processing apparatus 1003 will be described in detail below using the flow chart of FIG. 31.

In step S2501, the color space information setting unit 1018 sets a color expression space used to exchange data with other apparatuses, and a color conversion work space used inside the input-side image processing apparatus 1001. In step S2502, the input-side image processing apparatus 1001 executes image processes. In step S2503, the color space information setting unit 1212 sets a color expression space used to exchange data with other apparatuses, and a color conversion work space used inside the display-side image processing apparatus 1002. In step S2504, the display-side image processing apparatus 1002 executes image processes. In step S2505, the color space information setting unit 1313 sets a color expression space used to exchange data with other apparatuses, and a color conversion work space used inside the output-side image processing apparatus 1003. In step S2506, the output-side image processing apparatus 1003 executes image processes, thus ending the process. Note that the processing contents in step S2502 are the same as those in step S1201, the processing contents in step S2504 are the same as those in step S1202, and the processing contents in step S2506 are the same as those in step S1203.

[Color Space Information Setup User Interface]

Figure 32:
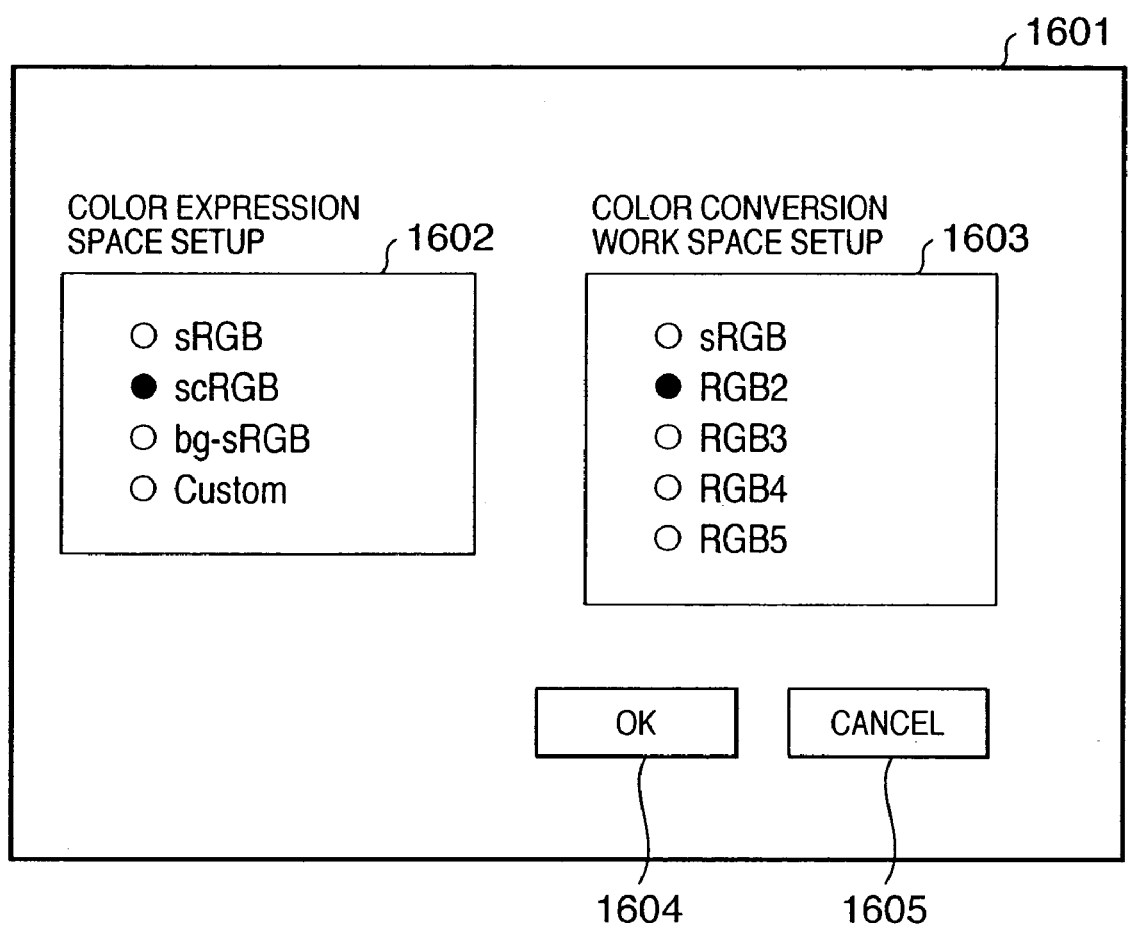
FIG. 32 shows an example of a user interface in the image processing apparatus of the sixth embodiment.

FIG. 32 shows an example of a user interface used when the user sets a color expression space used to exchange data with other apparatuses, and a color conversion work space used inside the respective image processing apparatuses using the color space information setting units 1018, 1212, and 1313. On a color expression space setup window 1602, a color expression space used to exchange data with other apparatuses is set. In this case, as examples of the color expression space, sRGB, scRGB, bg-sRGB, and a color space which can be customized by the user are presented, and scRGB is selected as the color expression space. On a color conversion work space setup window 1603, a color conversion work space used in each image processing apparatus is set. In this case, as examples of the color conversion work space, sRGB, RGB2, RGB3, RGB4, and RGB5 are presented, and RGB2 is selected as the color conversion work space. Upon completion of the setups, the user presses an OK button 1604. If the user wants to cancel the setups, he or she presses a cancel button 1605.

As described above, according to the sixth embodiment, upon exchanging image data among color image input/output devices or in image processes such as color conversion and the like, the user can individually set a color expression space used to exchange image data between the devices, and a color conversion work space used in the color conversion process inside the device.

Seventh Embodiment

FIG. 33 shows an example of image data to be exchanged among the input-side image processing apparatus 1001, display-side image processing apparatus 1002, and output-side image processing apparatus 1003. The color expression space information and color conversion work space information set in the fourth to sixth embodiments are appended to image data, and the processes in each image processing apparatus use the appended information to execute color conversion processes. As the information to be appended, the color expression space information includes definition equations (14) to (17) or their coefficients, and the color conversion work space information includes definition equations (12) and (13), their coefficients, or information shown in FIGS. 27A and 27B.

As described above, according to the seventh embodiment, upon exchanging image data among color image input/output devices or in image processes such as color conversion and the like, a color expression space used to exchange image data between the devices, and a color conversion work space used in the color conversion process inside the device can be individually set by appending them to an image.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the claims.

The invention claimed is:

1. A method of processing image data, comprising the steps of:
   inputting image data represented in a color space that is adapted to represent a value exceeding a visual limit range, wherein the visual limit range is a human visible range;
   determining whether or not the inputted image data falls outside the human visible range based on information of the visual limit range; and
   converting image data, which is determined to fall outside the human visible range, to image data representing a color on an inframarginal portion of the visual limit range.

2. The method according to claim 1, wherein the human visible range is a region, in an xy chromaticity diagram, which is surrounded in a spectrum locus and a purple boundary.

3. The method according to claim 1, further comprising the step of setting a conversion method of the converting step.

4. The method according to claim 3, wherein the conversion method includes at least one of: color difference minimization, lightness preservation, hue preservation, and saturation preservation.

5. The method according to claim 4, further comprising the step of setting a conversion condition of the conversion method.

6. The method according to claim 5, wherein the conversion condition includes at least one of: saturation preference, color difference preference, gradation preference, and lightness preference.

7. An image processing apparatus, comprising:
   an inputting section, arranged to input image data represented in a color space that is adapted to represent a value exceeding a visual limit range, wherein the visual limit range is a human visible range;
   a determiner, arranged to determine whether or not the inputted image data falls outside the human visible range based on information of the visual limit range; and
   a converter, arranged to convert image data, which is determined to fall outside the human visible range, to image data representing a color on an inframarginal portion of the visual limit range.

8. A computer readable medium encode with a computer program for a method of processing image data, the method comprising the steps of:
   inputting image data represented in a color space that is adapted to represent a value exceeding a visual limit range, wherein the visual limit range is a human visible range;
   determining whether or not the inputted image data falls outside the human visible range based on information of the visual limit range; and
   converting image data, which is determined to fall outside the human visible range, to image data representing a color on an inframarginal portion of the visual limit range.

9. A computer program stored on a computer readable medium comprising computer program code for a method of processing image data, the method comprising the steps of:

inputting image data represented in a color space that is adapted to represent a value exceeding a visual limit range, wherein the visual limit range is a human visible range;

determining whether or not the inputted image data falls outside the human visible range based on information of the visual limit range; and converting image data, which is determined to fall outside the range human visible, to image data representing a color on an inframarginal portion of the visual limit range.

* * * * *

UNITED STATES PATENT AND TRADEMARK OFFICE
CERTIFICATE OF CORRECTION

| | | |
|---|---|---|
| PATENT NO. | : 7,173,736 B2 | Page 1 of 1 |
| APPLICATION NO. | : 10/932000 | |
| DATED | : February 6, 2007 | |
| INVENTOR(S) | : Osamu Yamada | |

It is certified that error appears in the above-identified patent and that said Letters Patent is hereby corrected as shown below:

COLUMN 7

Line 30, "$f(Y/Yn)=(Y/Yn)^{1/3}$" should read --$f(Y/Yn)=(Y/Yn)^{1/3}$ (5.4)--.
Line 41, "$f(Z/Zn)=7.78(Z/Zn)+16/116$ (5.4)" should read
 --$f(Z/Zn)=7.78(Z/Zn)+16/116$--.

Line 47, "diffuser." should read --diffuser--.

COLUMN 16

Lines 32-34,
"$R_{scRGB}=R_{scRGB}(16)/8192+0.5$" should read --$R_{scRGB}=R_{scRGB}(16)/8192-0.5$--.
"$G_{scRGB}=G_{scRGB}(16)/8192+0.5$" should read --$G_{scRGB}=G_{scRGB}(16)/8192-0.5$--.
"$B_{scRGB}=B_{scRGB}(16)/8192+0.5$" should read --$B_{scRGB}=B_{scRGB}(16)/8192-0.5$--.

COLUMN 19

Line 12, "$f(Y/Yn)=(Y/Yn)^{1/3}$" should read --$f(Y/Yn)=(Y/Yn)^{1/3}$ (19.4)--.
Line 24, "$f(Z/Zn)=7.78(Z/Zn)+16/116$ (19.4)" should read
 --$f(Z/Zn)=7.78(Z/Zn)+16/116$--.

COLUMN 24

Line 50, "encode" should read --encoded--.

COLUMN 26

Line 2, "range human visible," should read --human visible range,--.

Signed and Sealed this

Twenty-fourth Day of July, 2007

JON W. DUDAS
*Director of the United States Patent and Trademark Office*